(12) United States Patent
Slaughter et al.

(10) Patent No.: US 10,993,430 B2
(45) Date of Patent: May 4, 2021

(54) ROBOTIC PLANT CARE SYSTEMS AND METHODS

(71) Applicant: THE REGENTS OF THE UNIVERSITY OF CALIFORNIA, Oakland, CA (US)

(72) Inventors: David C. Slaughter, Davis, CA (US); Durham K. Giles, Davis, CA (US); Steven A. Fennimore, Salinas, CA (US); Thuy T. Nguyen, Davis, CA (US); Vivian Vuong, Davis, CA (US); Leland Neilson, Woodland, CA (US); Ryan Billing, Sacramento, CA (US); Jedediah I. Roach, Sacramento, CA (US); Burt Vannucci, Davis, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 129 days.

(21) Appl. No.: 16/156,749

(22) Filed: Oct. 10, 2018

(65) Prior Publication Data

US 2019/0104722 A1    Apr. 11, 2019

Related U.S. Application Data

(63) Continuation of application No. PCT/US2017/027787, filed on Apr. 14, 2017.

(Continued)

(51) Int. Cl.
*A01M 7/00* (2006.01)
*A01B 39/18* (2006.01)
(Continued)

(52) U.S. Cl.
CPC .......... *A01M 7/0089* (2013.01); *A01B 39/18* (2013.01); *A01C 11/02* (2013.01); *A01C 21/005* (2013.01);
(Continued)

(58) Field of Classification Search
CPC .............. A01M 7/0089; A01M 21/043; A01M 7/0003; A01D 46/30; A01D 34/008;
(Continued)

(56) References Cited

U.S. PATENT DOCUMENTS

| 5,442,552 A | | 8/1995 | Slaughter |
| 5,994,265 A | * | 11/1999 | Barclay .................... C05G 5/36 504/100 |

(Continued)

FOREIGN PATENT DOCUMENTS

| CN | 2484123 | * | 6/2001 |
| DE | 196 42 439 | * | 11/1997 |

(Continued)

OTHER PUBLICATIONS

Machine translation for EP 1 762 135 (IDS) (Year: 2007).*
(Continued)

*Primary Examiner* — Qian Yang
(74) *Attorney, Agent, or Firm* — Park, Vaughan, Fleming & Dowler LLP

(57) ABSTRACT

A crop signaling method and machine-based crop recognition system and methods are disclosed to detect a unique optical crop signal selectively applied to crop plants, allowing automatic differentiation of crop plants from weeds and the automatic creation of a high spatial resolution crop and weed plant map, along with automated plant management tasks.

20 Claims, 16 Drawing Sheets

Related U.S. Application Data

(60) Provisional application No. 62/323,446, filed on Apr. 15, 2016.

(51) Int. Cl.
| | | |
|---|---|---|
| *A01C 21/00* | (2006.01) | |
| *A01C 11/02* | (2006.01) | |
| *G06T 7/00* | (2017.01) | |
| *A01D 34/00* | (2006.01) | |
| *G06T 7/10* | (2017.01) | |
| *A01M 21/04* | (2006.01) | |
| A01D 46/30 | (2006.01) | |
| A01G 7/06 | (2006.01) | |
| G06K 9/46 | (2006.01) | |

(52) U.S. Cl.
CPC ......... *A01D 34/008* (2013.01); *A01M 21/043* (2013.01); *G06T 7/0012* (2013.01); *G06T 7/10* (2017.01); *A01D 46/30* (2013.01); *A01G 7/06* (2013.01); *A01M 7/0003* (2013.01); *G06K 9/4652* (2013.01); *G06K 9/4661* (2013.01); *G06T 2207/10024* (2013.01); *G06T 2207/20112* (2013.01); *G06T 2207/30188* (2013.01)

(58) Field of Classification Search
CPC . G06T 2207/30188; G06T 2207/20112; G06T 7/10; G06T 7/0012; G06T 2207/10024; A01C 11/02; A01C 21/005; A01B 39/18; A01G 7/06; G06K 9/4661; G06K 9/4652
See application file for complete search history.

(56) References Cited

U.S. PATENT DOCUMENTS

| | | | | |
|---|---|---|---|---|
| 6,350,531 | B1* | 2/2002 | Sugimoto | ............... C08L 67/04 428/533 |
| 2004/0149893 | A1 | 8/2004 | Scott | |
| 2005/0091717 | A1* | 4/2005 | Amasino | ............. C07K 14/415 800/287 |
| 2006/0014645 | A1* | 1/2006 | Yavitz | ..................... C05F 11/10 504/241 |
| 2008/0220971 | A1* | 9/2008 | de Boer | ............. C12N 15/8261 504/116.1 |
| 2011/0167721 | A1* | 7/2011 | Lejeune | ................. G05B 15/02 47/65 |
| 2013/0146319 | A1* | 6/2013 | Truex | ....................... A01B 1/20 172/378 |
| 2014/0303814 | A1* | 10/2014 | Burema | ................... B64D 1/16 701/3 |
| 2015/0247158 | A1* | 9/2015 | Kepinski | ............ C12N 15/8294 435/419 |
| 2015/0293029 | A1* | 10/2015 | Acheson | ................ G01N 21/84 356/51 |

FOREIGN PATENT DOCUMENTS

| | | |
|---|---|---|
| EP | 1762135 B1 | 3/2007 |
| EP | 2338322 B1 | 6/2011 |
| WO | 2012094116 A1 | 7/2012 |

OTHER PUBLICATIONS

Machine translation for DE 196 42 439 (Year: 1997).*
Machine translation for CN 2484123 (Year: 2001).*
ISA/KR, Korean Intellectual Property Office (KIPO), International Search Report and Written Opinion dated Aug. 18, 2017, related PCT international application No. PCT/US2017/027787, pp. 1-15, claims searched, pp. 16-19.
Bailey, Pat, "UC Davis developing faster, more accurate robotic cultivator", downloaded from https://www.ucdavis.edu/news/uc-davis-developing-faster-more-accurate-robotic-cultivator/ on Feb. 23, 2016, 8 pages, published Jan. 21, 2015.

* cited by examiner

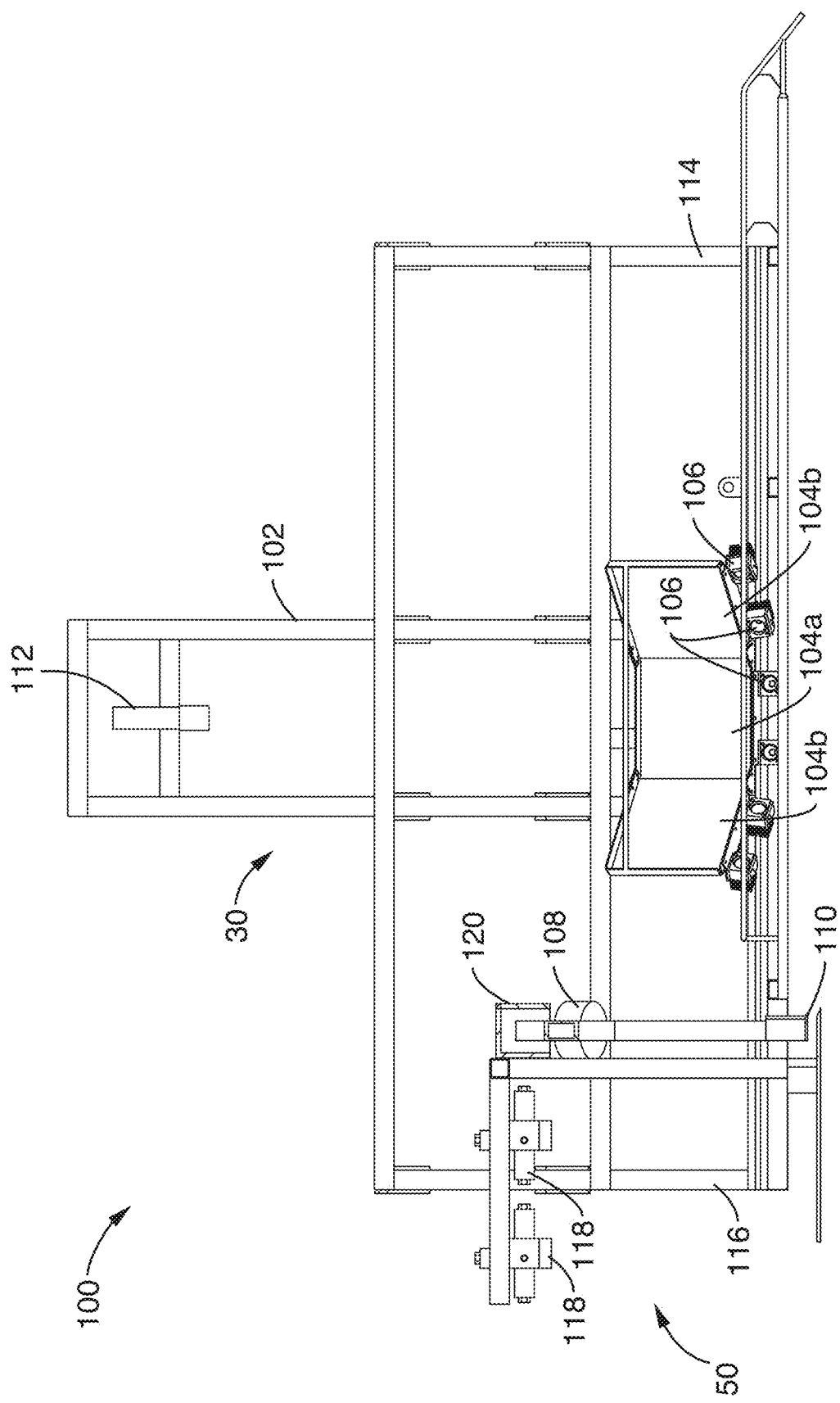

FIG. 11A
FIG. 11B
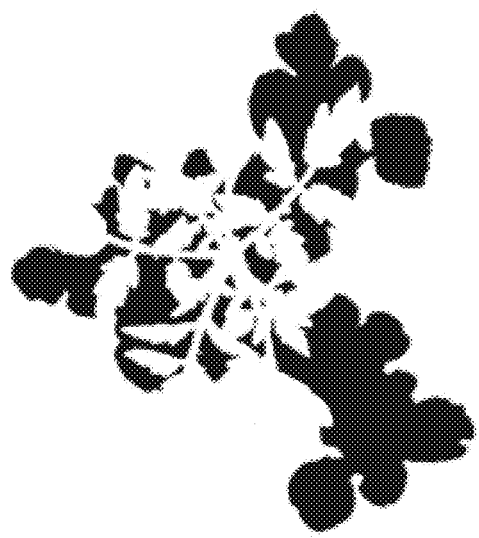
FIG. 11C

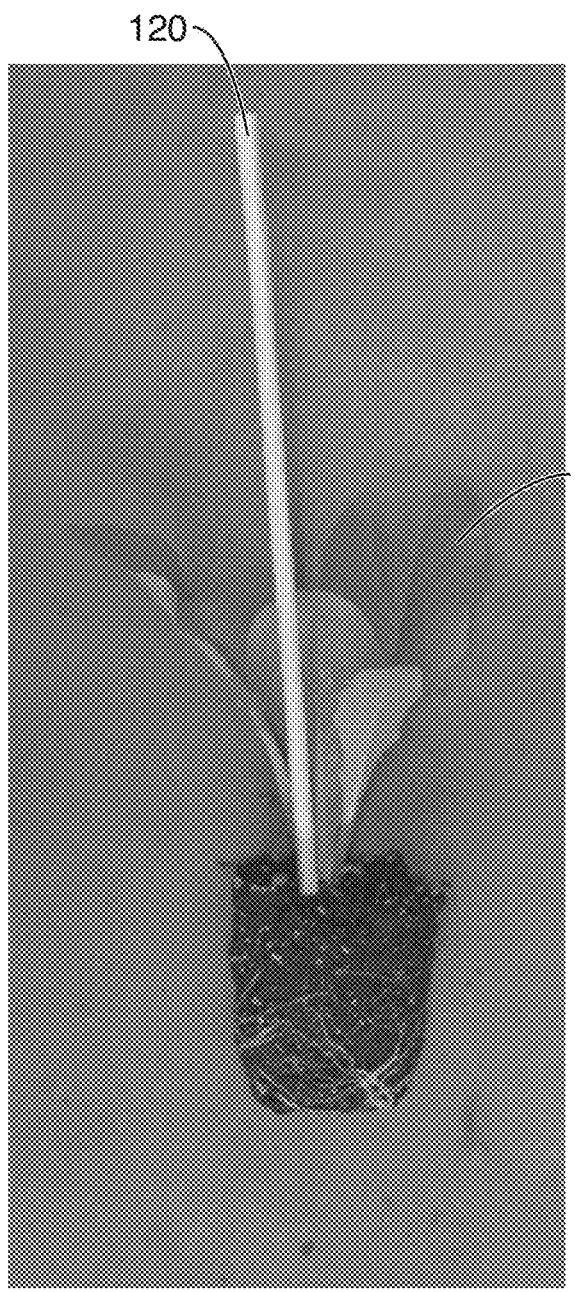 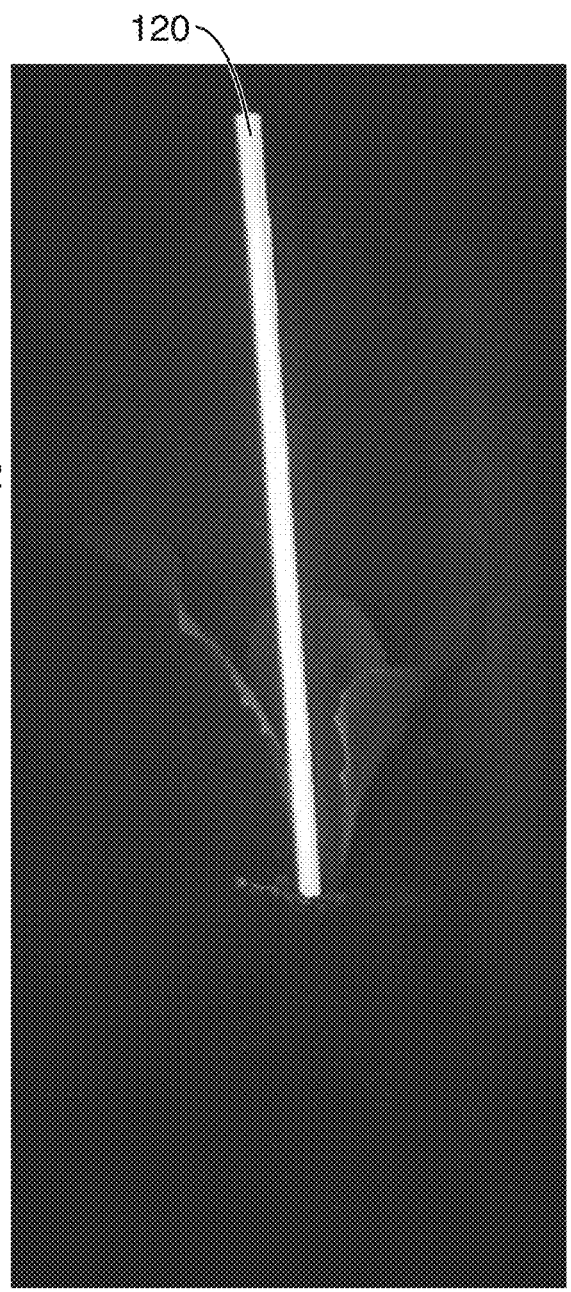
FIG. 13A  FIG. 13B

ROBOTIC PLANT CARE SYSTEMS AND METHODS

CROSS-REFERENCE TO RELATED APPLICATIONS

This application claims priority to, and is a 35 U.S.C. § 111(a) continuation of, PCT international application number PCT/US2017/027787 filed on Apr. 14, 2017, incorporated herein by reference in its entirety, which claims priority to, and the benefit of, U.S. provisional patent application Ser. No. 62/323,446 filed on Apr. 15, 2016, incorporated herein by reference in its entirety. Priority is claimed to each of the foregoing applications.

The above-referenced PCT international application was published as PCT International Publication No. WO 2017/181127 A1 on Oct. 19, 2017, which publication is incorporated herein by reference in its entirety.

STATEMENT REGARDING FEDERALLY SPONSORED RESEARCH OR DEVELOPMENT

This invention was made with Government support under Grant No. 2014-51181-22379, awarded by the U.S. Department of Agriculture. The Government has certain rights in the invention.

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

This description pertains generally to automated plant detection and care, and more particularly to automated plant detection and care for crop management.

2. Background Discussion

Reliable machine recognition of plant identity (crop vs. weed) is a major impediment to the commercial development of automated plant care systems such as automatic weed control machines that can reliably control intra-row weeds on a farm.

Existing crop monitoring systems typically utilize machine vision technology to detect plant location and accurately direct herbicidal sprays, to thin crops, like lettuce, to desired stands. However, the current state-of-the-art in this technology cannot reliably distinguish crop from weed plants, but depends upon recognition of row patterns to detect the crop row, and rudimentary object detection for selection of unwanted crop plants for thinning. Research on these systems shows that while such systems may work well in weed-free fields, their performance is limited in weedy fields, which obscure the row pattern.

BRIEF SUMMARY

Aspects of the present technology are systems and methods of communication between plants and machines, referred to as crop signaling, in which the identity and location of a crop plant can be communicated in a rapid and reliable way via digital imaging for use in a machine or mobile robot that is configured to perform automated care of crop plants based on identification of the crop plant and/or other foliage near or adjacent to the crop plant.

Another aspect is a system containing one or more of an automated system for applying crop signaling technology to crop plants at planting, and robotic systems that are capable of detecting and interpreting signals coming from a crop plant and then providing individualized plant care tasks in response to the needs of the plant.

By way of example, and not of limitation, the technology described herein uses a systems approach to the crop recognition problem, called crop signaling. In crop signaling, the crop is equipped with a signaling mechanism that allows the crop to produce a unique machine recognizable signal that, unambiguously and with a very high reliability, indicates which plants growing outdoors on a farm are crop plants and which plants are weeds.

The technology of this disclosure includes both: (1) the machine that automatically implements the crop signaling technology at planting, and (2) the machine that automatically detects the crop signal and then automatically conducts the plant care task required in response to the crop signal presented.

Crop signaling is a method of equipping plants with a unique machine readable signature. Some examples of crop signaling include: biomarkers utilizing fluorescent proteins (genetic modification of crop plants to allow self-generation), systemic (internally applied) pigments, externally applied signaling compounds, and a physical label or tag attached to the crop.

Systems and methods are shown for crop signaling technology, and particularly its application in a systems approach to facilitate automated individual plant care, with a specific example for automatic weed control.

In the technology of this disclosure, crop vs. weed identification is performed by applying a crop signaling compound to the crop plants at the time of planting, at a time when the certainty of identity (crop vs. weed) is guaranteed. The systems approach transfers the knowledge of crop identity forward in time, through the presence of the applied crop signal, for later use in automated weed management or automation of other individual plant care tasks, like application of crop protection chemicals.

The crop signaling compound of the present disclosure is configured to have a unique optical signature that greatly simplifies and ensures the success of the crop vs. weed detection task. Later, at the time when crop plant care is required, machine sensing techniques are deployed to detect and precisely locate all plants (both crop and weeds) in real-time. This machine-based crop recognition system will also detect the unique optical crop signal carried by the crop plants, allowing automatic differentiation of crop plants from weeds and the automatic creation of a high spatial resolution crop and weed plant map. The crop/weed map is then used by automated, high spatial resolution plant care tasks, such as a weed destruction mechanism that is capable of selectively targeting a lethal action to individual weed plants growing in the intra-row area without damaging the crop plants.

Once the crop is identified and localized using the crop signaling identification system, a plant care system can conduct other plant care tasks, such as applying foliar nutrients, fungicides, or insecticides to the plant, in addition to the described example for weed control.

Further aspects of the technology will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 10 shows a side view of a plant care assembly incorporating both a crop identification system and a plant care device.

FIG. 11A shows an image of a crop (i.e., the tomato) treated with the crop signaling compound before transplanting.

FIG. 11B shows an image of an automatic pseudo color-coded result to identify crop and weed plants.

FIG. 11C shows a final binary weed image, with tomato foliage and soil shown as white, and weed foliage as black.

Figure 12A:
FIG. 12A is a processed image showing pixel level segmentation of a section of a row of tomato plants surrounded by purslane weeds, where a crop signaling treatment to the tomato plants prior to planting was used to distinguish tomato from weeds.
Figure 12B:
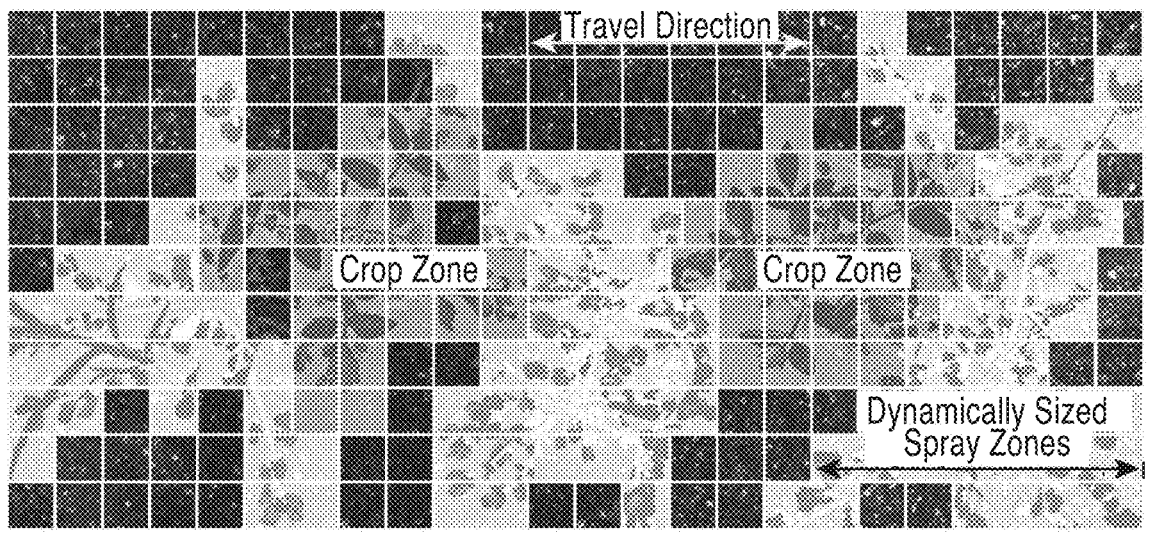

FIG. 12B is an image of a spray plan grid overlaid on the pixel level data from FIG. 12A showing the individual 1 cm wide (perpendicular to the direction of travel) spray plan. Dark cells are designated as weed regions to be sprayed with herbicide, and lighter cells are regions to be sprayed with plant growth nutrients, and all forms of pest and pathogen protection such as fungicides, insecticides, etc.

FIG. 13A shows an image of a lettuce transplant with a drinking straw tube having a fluorescent dye.

FIG. 13B shows the lettuce transplant from FIG. 13A photographed under backlight, showing the fluorescence of the drinking straw.

Figure 14A:
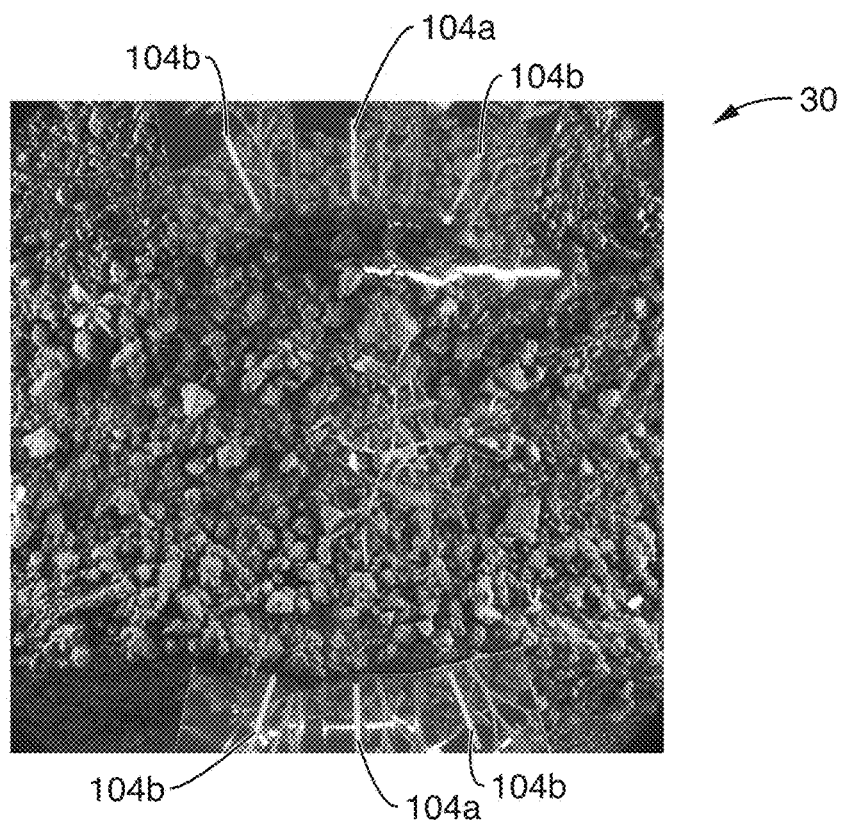

FIG. 14A shows a white light illuminated image of field-grown tomato plants with the crop signaling plant label viewed via a crop identification system in accordance with the present description.

Figure 14B:
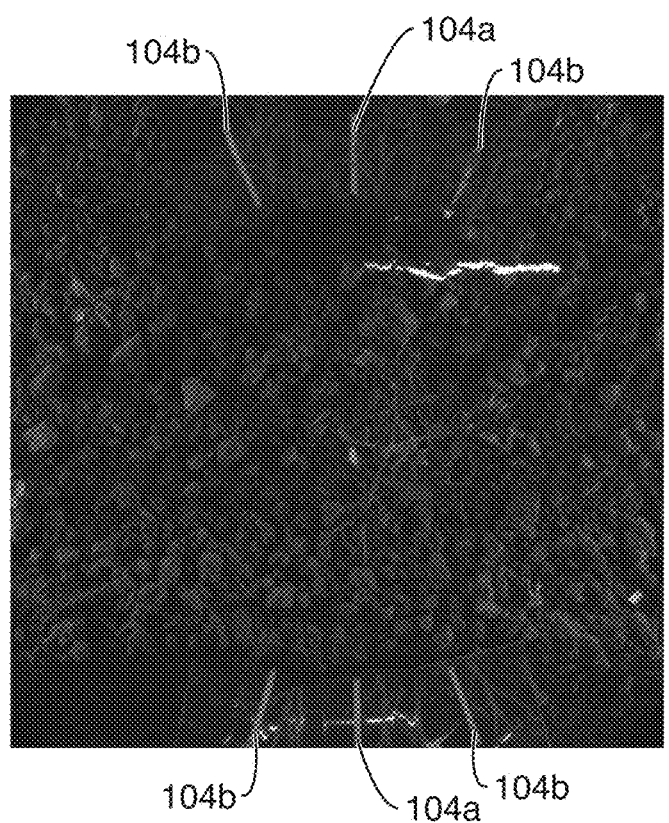

FIG. 14B shows same scene as shown in FIG. 14A, but with UV light illuminating the scene, illustrating the fluorescent feature of the crop signaling compound and the ease of detection.

Figure 15A:
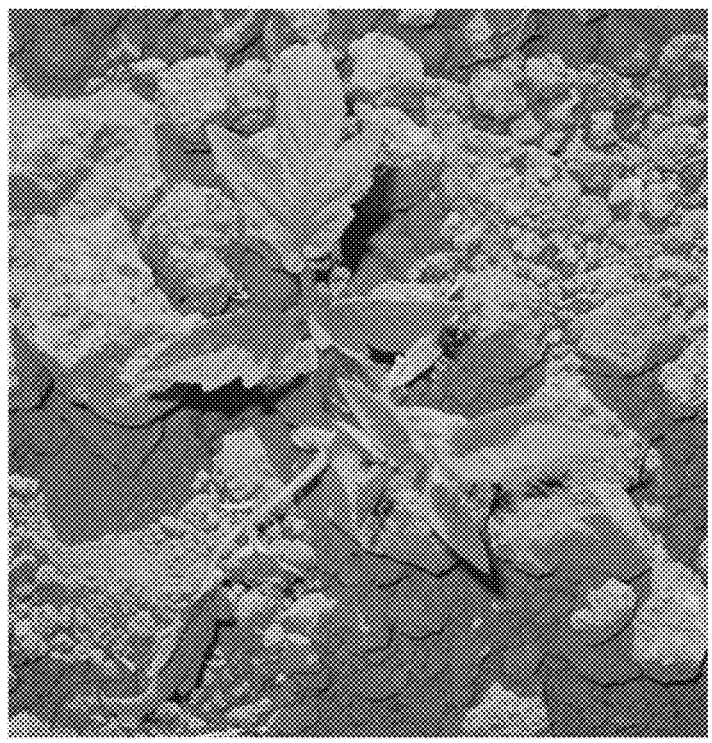

FIG. 15A is a close up photograph showing the tomato foliage coated with a fluorescent orange material.

Figure 15B:
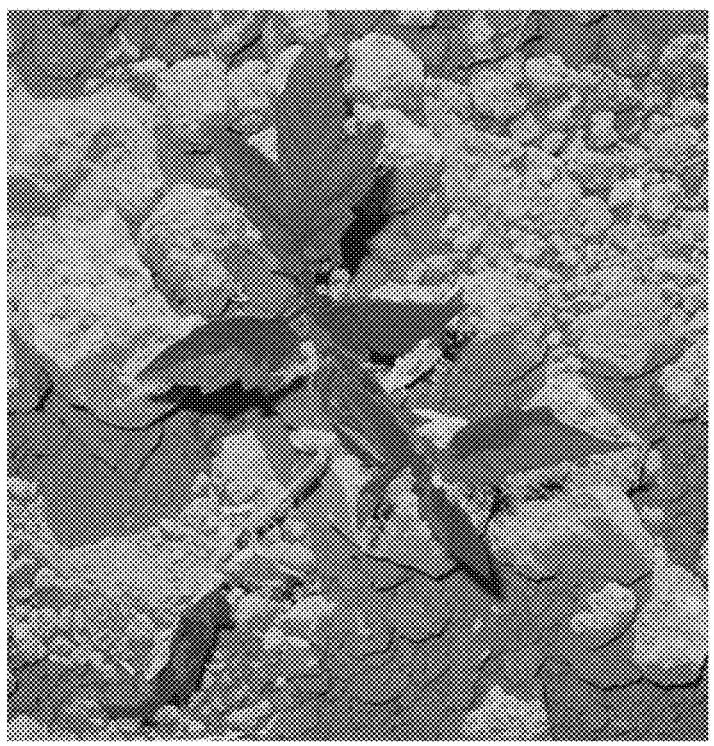

FIG. 15B is an image after automatically generated computer vision techniques were applied to the Image of FIG. 15A. The coated tomato foliage was colored purple (illustrated by the more dramatic contrast to the background) by the imaging techniques of the present technology.

Figure 16A:

FIG. 16A is a daytime photograph taken from inside a cultivation tunnel showing a transplanted tomato and a purslane weed.

Figure 16B:

FIG. 16B is an image taken during the day, immediately after the image of FIG. 16A, but with 400 Watts of UV light adding to the sunlight inside the tunnel.

Figure 16C:

FIG. 16C is an automatically generated image using computer vision techniques by subtracting FIG. 16A from FIG. 16B, with the light shades corresponding to the isolated crop plant.

Figure 16D:
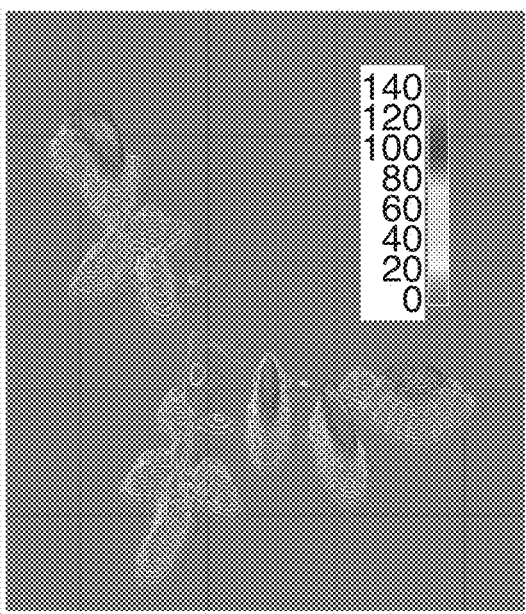

FIG. 16D is a 3D version of FIG. 16C illustrating the signal to noise ratio.

Figure 17:
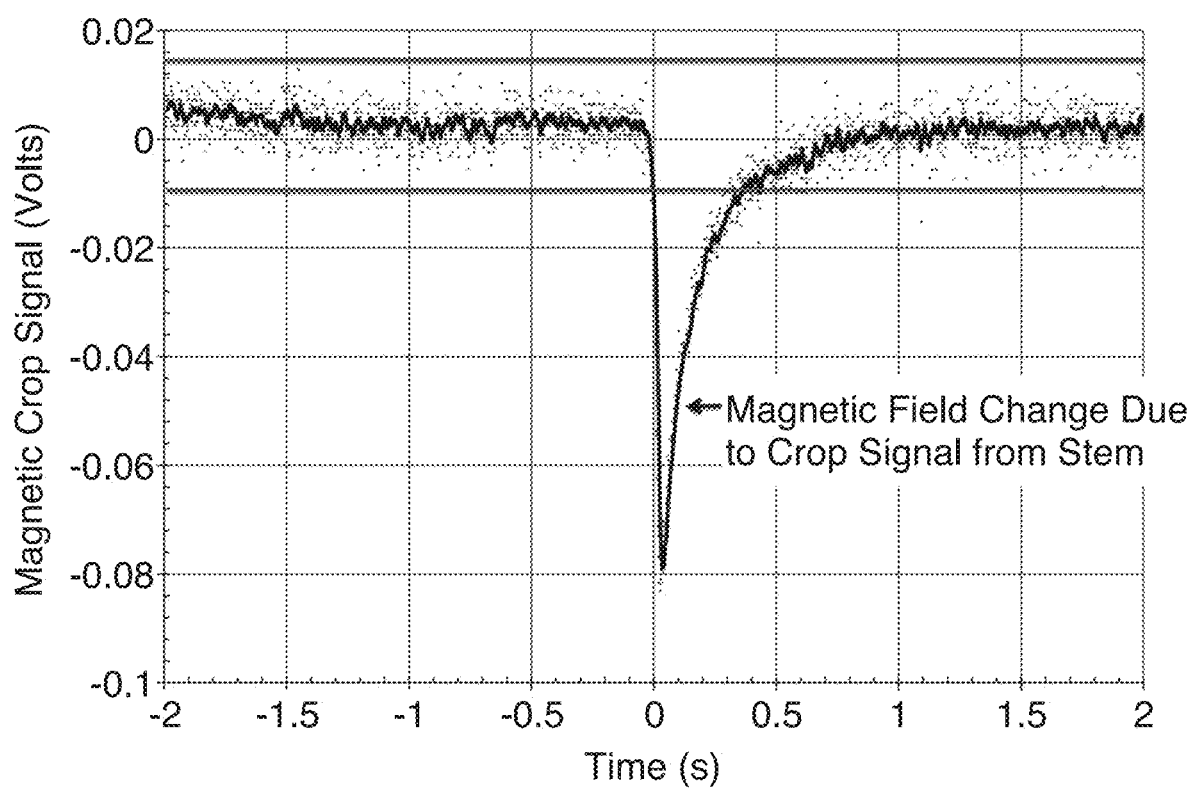

FIG. 17 shows a plot of the change in the magnetic field caused by magnetic crop signal.

DETAILED DESCRIPTION

Figure 1:
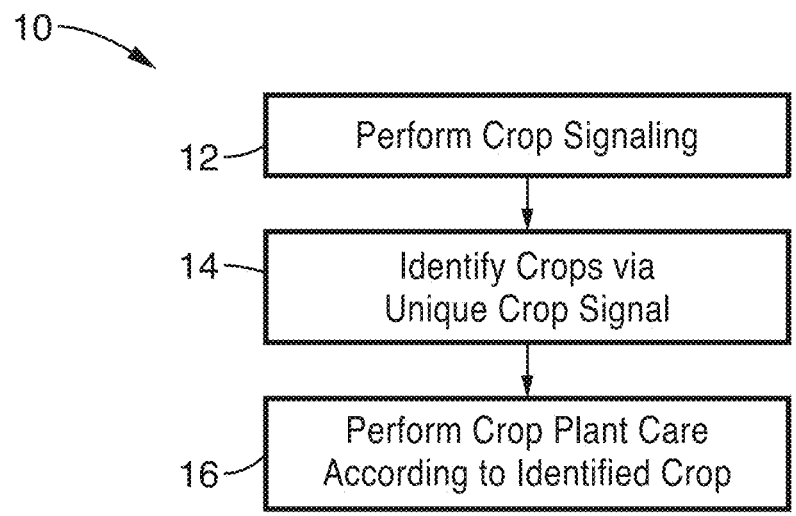
FIG. 1 is a high level flow diagram of an automated crop care processing method in accordance with the present description.

FIG. 1 is a high level flow diagram of an automated crop care process 10 using crop signaling for plant detection in accordance with the present description. First, at step 12, crop signaling compound is applied or otherwise administered to target crop plants prior to or at the time of planting, when the certainty of identity (crop vs. weed) is guaranteed. The crop signaling compound is configured to have a unique optical signature that greatly simplifies and ensures the success of a latter crop vs. weed detection task. Thus, crop identity is allocated through the presence of the applied crop signal for later use in automated weed management or automation of other individual plant care tasks.

Next, at step 14 when crop plant care is desired, machine sensing techniques are deployed to detect and locate, in real time, the unique optical crop signal carried by the crop plants, as well as all plants in proximity thereto (i.e. identification of both crop and weeds or other foliage). This identification step may be in the form of a number of different sensing or detection modalities. For example, optical sensors (e.g. cameras) may be used for optical detection, and magnetic field sensors may be used to detect magnetic crop signals.

With the identity of the crop and/or weed known and located, one or more crop care tasks may be performed at step 16, e.g. weed removal/destruction or poisoning, administration of plant fertilizer or supplements, or the like.

Figure 2:
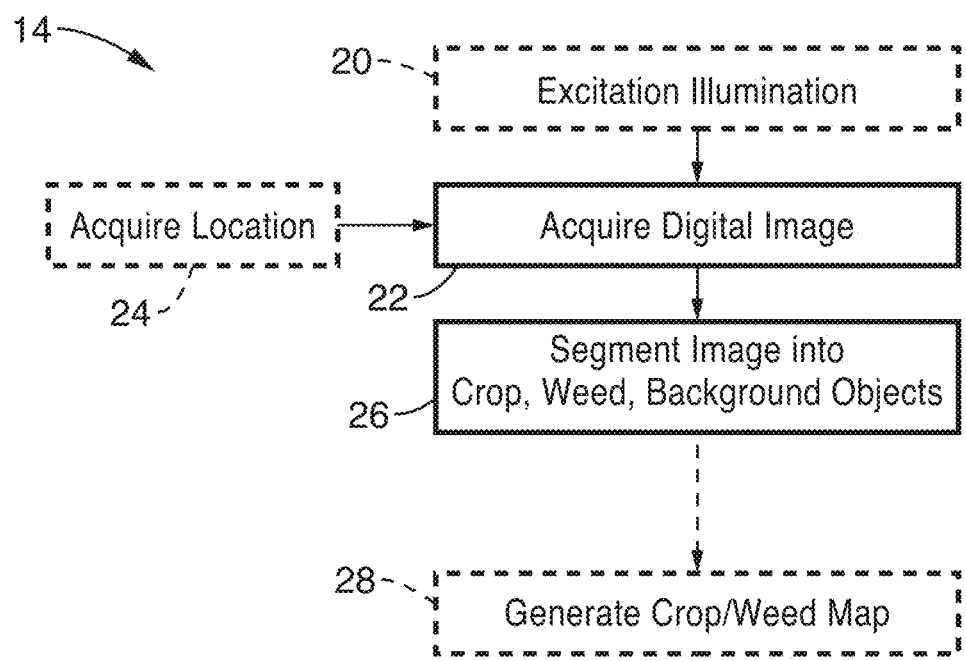
FIG. 2 is a high level flow diagram of the automated crop identification method of FIG. 1.

FIG. 2 is a high level flow diagram of the automated crop identification method 14 of FIG. 1. It should be noted that identification method 14 is illustrated in FIG. 2 with reference to an optical crop signal, and that different identification methods may be incorporated for non-optical crop signals as appropriate. First, the crop may optionally be illuminated at step 20 with an excitation light, e.g. fluorescent light or the like illumination that excites a unique crop signal applied to the crop. In applications where the crop signal is identifiable via visible light, this step may be skipped.

Figure 3:
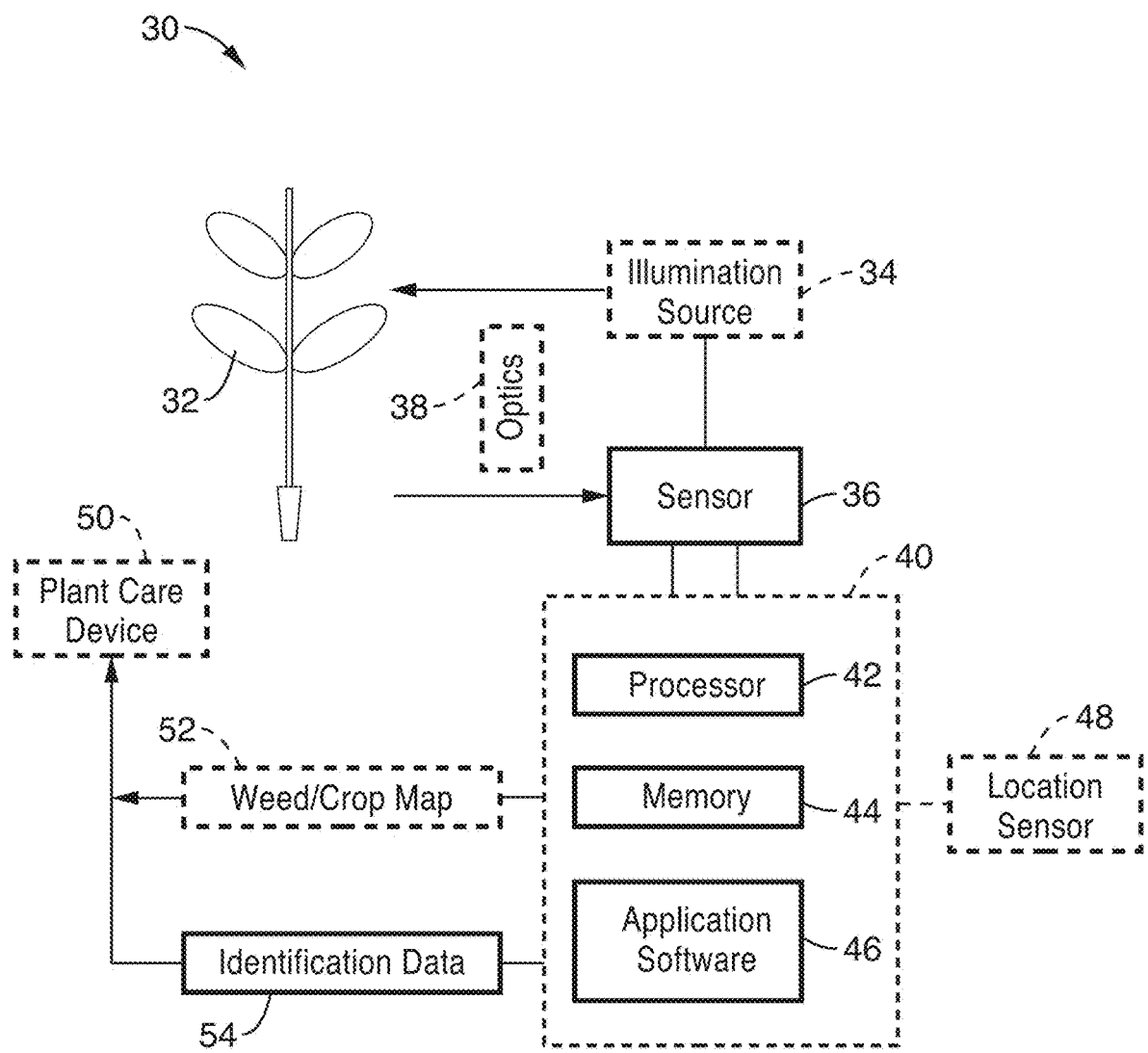
FIG. 3 shows a high-level schematic diagram of an automated crop identification and care system in accordance with the present description.

The next step (or first step for visible crop signals) is to acquire a digital color image of the scene at step 22 (e.g. signal sensor 36 shown in FIG. 3). Where the signal sensor 36 comprises a camera, step 22 may be achieved using the camera Software Development Kit to send a command to the camera via USB, or Ethernet, or RS-232, or by using a computer-controlled relay to close a camera trigger switch (not shown). This may also include transfer of the digital color image into the memory of the computer. Such transfer can be achieved using any of following: analog transfer to a digitizing circuit board in the computer, USB, Ethernet, Camera-Link, Channel-Link, etc.

Coincident with image acquisition step 22, location information may optionally be retrieved at step 24 to assign location data to the acquired image.

Next, at step 26 the image is segmented into crop, weed, and background objects using the crop signal information retrieved from the acquired image.

Optionally, at step 28, a crop/weed map may be generated from the segmented image, detailing the location of one or more of crop, weeds, or other foliage within a 2-dimensional space. The crop/weed map may then be used by one or more automated, high spatial resolution plant care tasks (see step 16 in FIG. 1), such as an application of crop protection chemicals, or weed other destruction tasks that are capable of selectively targeting a lethal action to individual weed plants growing in an intra-row area, without damaging the crop plants.

FIG. 3 shows a high level schematic diagram of an automated crop identification/recognition system 30 configured for performing methods 10 and 14 in accordance with the present description. This machine-based crop identification system 30 is configured to detect the unique crop signal carried by the crop plants 32, allowing automatic differentiation of crop plants from weeds and the automatic creation of a high spatial resolution crop and weed plant map. A crop-signal sensor 36 is provided that is configured to acquire data used for detection of the crop signal associated with a target crop plant.

Where the crop signal is an optic signal, the crop-signal sensor 36 comprises an imaging device configured to take an image of the crop 32, and may be specifically configured to detect light according to the specified crop signal. Where special illumination is required for detection, the identification/recognition system 30 optionally comprises an illumination source configured to direct light at the crop plant 32. Additional optics 38 may also be provided, such as mirrors, filters, etc., to act on or manipulate light from illumination source 34 or to optical sensor 36.

A computer/controller 40 is configured to receive data (i.e. images) from the signal sensor 36 and execute application programming 46 via processor 42 to process data/images from the signal sensor 36 and perform identification method 14, and/or control operation of signal sensor 36 and illumination source 34. Memory 44 is provided to store application programming 46, captured images, as well as location data, and output crop/weed maps and segment segmented images.

A geolocation sensor 28 may optionally be coupled to computer 40 to continuously or intermittently monitor the geospatial location of the system. This can be based on GPS, an odometer, or the like.

Output from the application programming 46 (e.g. segmentation/identification data 54, crop/weed maps 52, etc.), may then be used for operation of one or more plant care devices 50. Additionally, application programming 46 may have code configured for controlling operation of plant care device 50.

Referring back to FIG. 1, the crop signaling step 12 may be implemented using one of the following four basic approaches: 1) transgenic methods, 2) systemic translocation, 3) foliar coating, and 4) plant labels.

Figure 4A:
FIG. 4A shows an image of a purple transgenic tomato plant created by inserting the Lc gene into a tomato plant, with a single purple tomato plant in the center, surrounded by green weed plants.
Figure 4B:
FIG. 4B shows a single purple tomato plant in the center, with a green nightshade weed in the lower left.

Transgenic crop signaling involves genetically manipulating the plant to cause it to produce a unique optical signal. To produce a crop on a farm with transgenic crop signaling, transgenic seeds are produced and planted in the field using the same methods as with conventional hybrid seed. For example, the Lc maize anthocyanin regulatory gene (Lc gene) determines the expression of anthocyanins in vegetative tissues and the transgenetic insertion of the Lc gene into a tomato plant results in a deeply purple colored foliage in tomato as shown in FIG. 4A and FIG. 4B. FIG. 4A shows an image of a purple transgenic tomato plant created by inserting the Lc gene into a tomato plant, with a single purple tomato plant in the center, surrounded by green weed plants. FIG. 4B shows a single purple tomato plant in the center, with a green nightshade weed in the lower left.

The unique crop signal (i.e. the purple color in this case) created by transgenic insertion of the Lc gene into a tomato plant produces a tomato plant that has a unique reflectance signal when illuminated by sunlight or any white light source. The automated crop identification/recognition system 30 may then perform segmentation step 26 of FIG. 2 by executing the following steps in software:

In the case of the Lc gene, this can be done using color image processing, by:
a) Thresholding the excessive purple and excessive green signals. Objects with high values of ExP are purple in color and represent plants with the Lc gene, and plants with high values of ExG are green in color and represent weeds, where:

$$\text{Excessive Purple}=ExP=\text{Red}+\text{Blue}-2*\text{Green}, \quad \text{Eq. 1}$$

$$\text{Excessive Green}=ExG=2*\text{Green}-\text{Red}-\text{Blue}. \quad \text{Eq. 2}$$

b) Thresholding the hue, saturation, and value levels in an image that has been converted from a red, green, blue color image into the hue, saturation, and value color space.

In either case, thresholding can be done using fixed levels determined in a machine learning training step, or by adaptive thresholding methods, or by neural network or a Bayesian classifier approach.

Figure 4C:
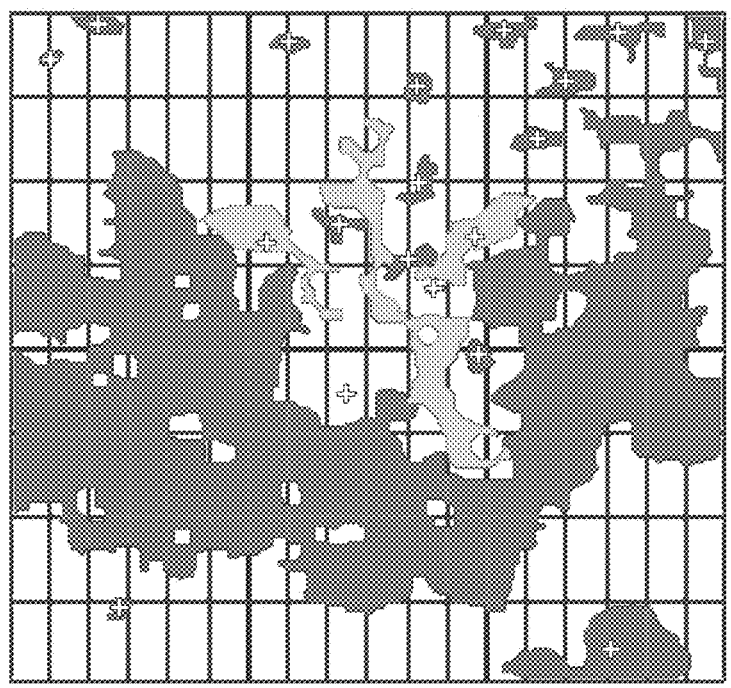
FIG. 4C and FIG. 4D show image processing of the transgenic tomato plants of FIG. 4A and FIG. 4B, respectively.
Figure 4D:
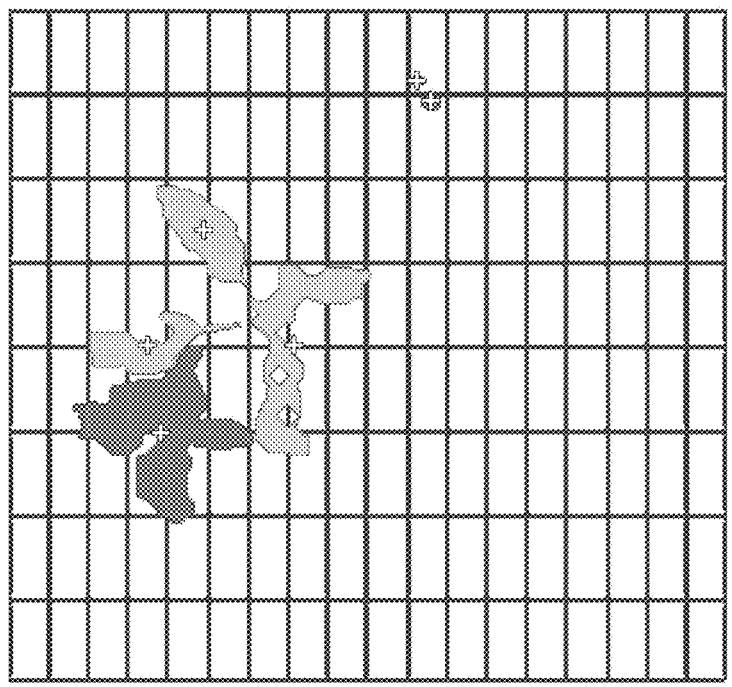

FIG. 4C and FIG. 4D show image processing of the transgenic tomato plants of FIG. 4A and FIG. 4B, respectively. FIG. 4C shows the single tomato plant in the center of FIG. 4A in light grey, surrounded by weed plants shown in dark grey (background in black). FIG. 4D shows the single tomato plant in the center FIG. 4B in light grey, the nightshade weeds shown in dark grey.

It is also possible to use transgenic methods to produce a fluorescent crop signal effect. In such case, the automated crop identification/recognition system 30 is equipped with an illumination source 34 (e.g. monochromatic excitation light) matched to the fluorescent protein that is transgenically inserted into the crop and optics 38 in the form of an emission filter (i.e. an optical band pass filter) that matches the emission peak wavelength of the fluorescent protein.

Figure 5:
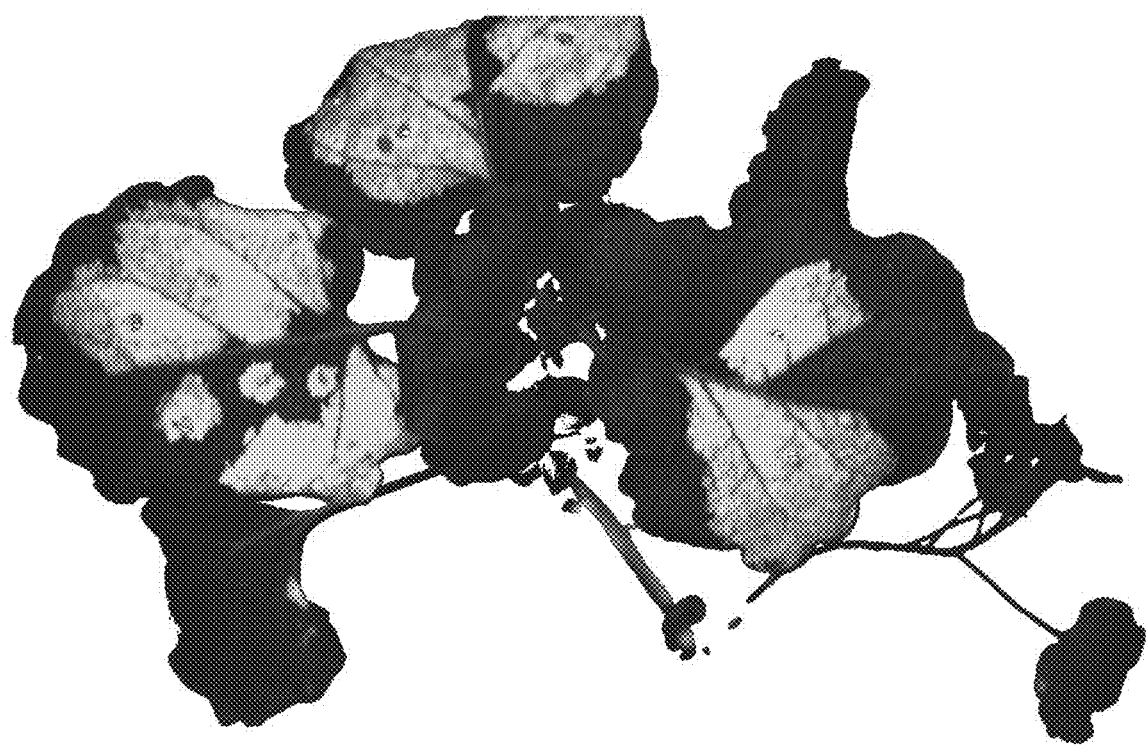
FIG. 5 shows a digital image taken of a N. benthamiana plant that is transgenically modified to produce a fluorescent crop signal.

FIG. 5 shows a digital image taken of a *N. benthamiana* plant that is transgenically modified to produce a fluorescent crop signal. The bright areas of the plant leaf were transgenically modified using agrobacteria to demonstrate agrobacterium-mediated transient fluorescent protein expression. The protein produced by the agrobacteria is eGFP. The image was acquired using a digital camera equipped with a 520 nm band pass filter in front of the camera and the plant was illuminated using 470 nm LEDs. The protein eGFP fluoresces when excited by 470 nm monochromatic (i.e. blue) light and emits green light at 520 nm.

Crop signaling step 12 (FIG. 1) may also be performed via systemic translocation. To produce a crop on a farm with systemic crop signaling, two primary methods may be employed: 1) employing the crop signaling compound in pelleted seed (FIG. 6), or 2) applying the crop signaling compound to target plants using a foliar application prior to transplanting.

Figure 6:
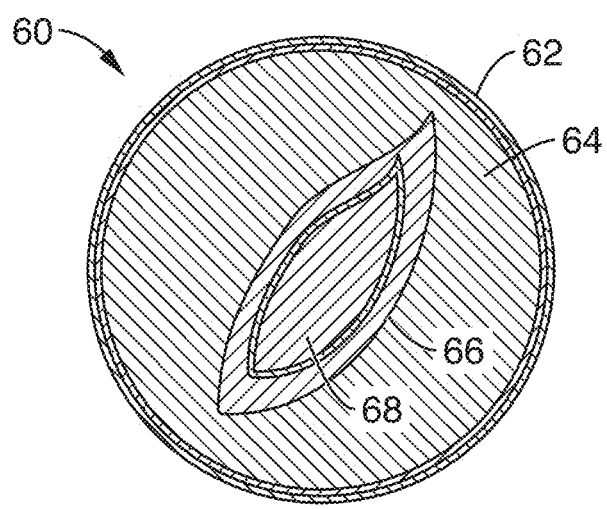
FIG. 6 shows a schematic diagram illustrating the application of a systemic crop signaling compound to the plant via a seed coating incorporated into the pellet material of a pelleted seed.

FIG. 6 shows a schematic diagram illustrating the application of a systemic crop signaling compound to the plant via a seed coating incorporated into the pellet material of a pelleted seed 60. In the embodiment of FIG. 6, a lettuce seed 68 is coated with a signaling compound 64 fungicide 66, and encapsulated with outer barrier 62. In operation, the pelleted seeds 60 are planted directly in the field using the same methods as is done for other pelleted seed.

In the case of a foliar application of the crop signaling compound, transplanted crop plants may be treated (sprayed) in the greenhouse prior to planting the field. A crop plant can be manipulated to cause it to produce a unique signal (typically optical, but electro-magnetic or other signals may also be used) using systemic translocation in the vascular system of the plant.

Figure 7:
FIG. 7 is an image illustrating systemic translocation of a crop signaling compound in celery.

FIG. 7 illustrates systemic translocation of a crop signaling compound in celery. The plant on the right side shows the systemic uptake of an orange fluorescent material in a celery plant. The plant on the left side is the normal celery plant showing no systemic material in the foliage.

To produce a crop on a farm using foliar crop signaling, the crop signaling compound is applied to the plants using a foliar application prior to transplanting.

A compound, such as a water-based acrylic paint, can be applied to crop plants using a spray application to provide crop signaling. Most crop signaling compounds are compatible with conventional spray application methods and equipment. Plants can be sprayed while the plants are still in the multi-cell trays, however experiments have shown that the application coverage is superior if the plants are spaced apart during application to ensure good coverage.

In one embodiment, foliar application of the signaling compound may be performed using an overhead spray application to crop plants in transplant flats prior to transplanting. For example, a spray nozzle (not shown) positioned over the crop plants to apply crop signaling compound to the canopy. E.g., one embodiment would incorporate a flat of lettuce plants traveling on a conveyor and passing under a spray nozzle that is applying a signaling compound to the lettuce plants.

Figure 8:
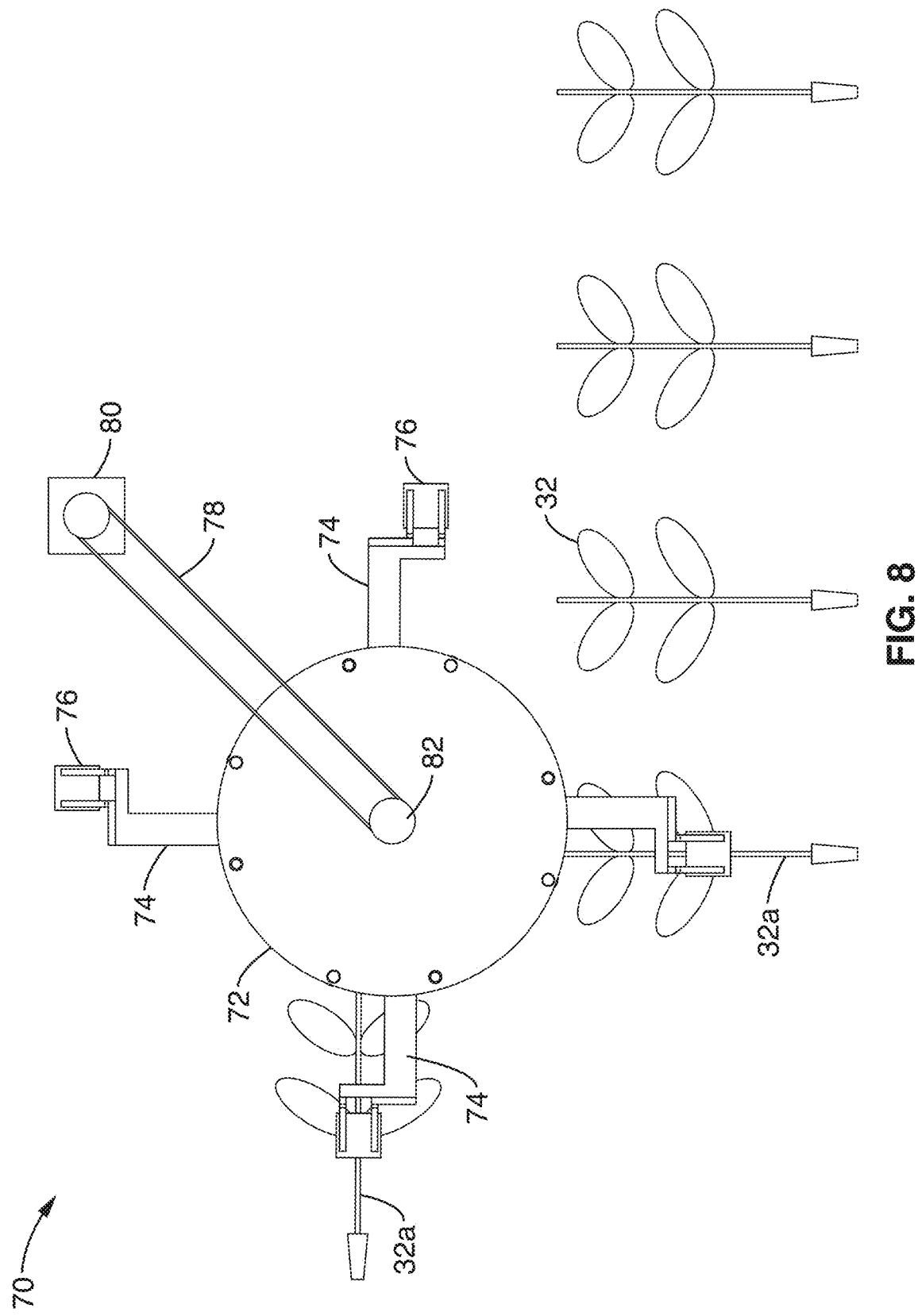
FIG. 8 shows a schematic side view of a crop transplanter in accordance with the present description.
Figure 9:
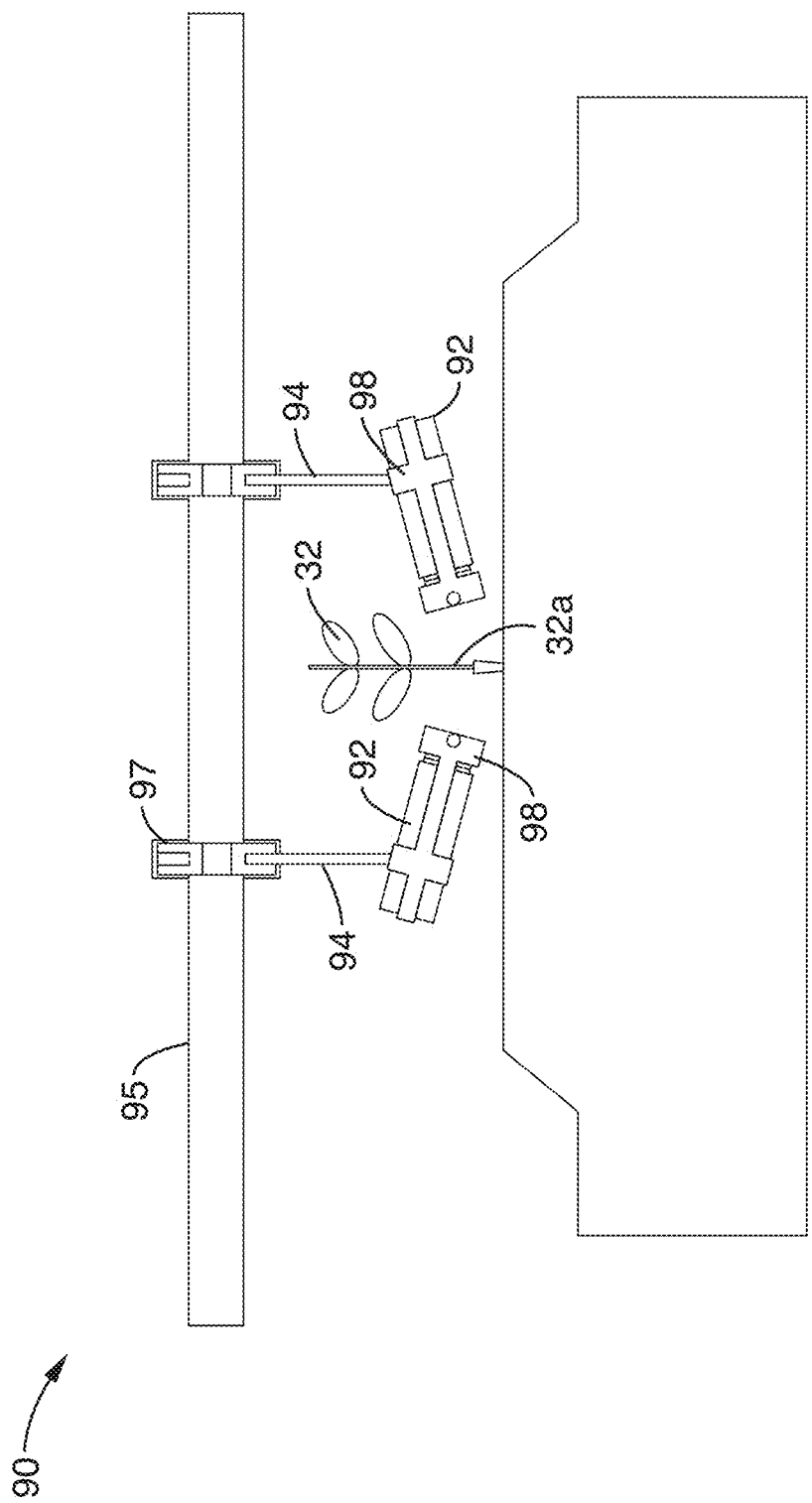
FIG. 9 shows a side view of a signaling compound applicator assembly configured to be coupled to or operate subsequent to the crop transplanter of FIG. 8.

As an alternative implementation, application of the signaling compound can be performed on-the-fly during transplanting using an automated system as shown in FIG. 8 and FIG. 9.

FIG. 8 shows a crop transplanter 70 comprising a location sensor attached to the planting wheel 72 of a transplanter. Plants 32 are planted via a plurality of plant holders 76 disposed on arms 74 of wheel 72. Motor 80 drives belt 78 and corresponding motion of the transplanter 70. In a preferred embodiment, this is done by using an absolute rotary shaft encoder that is either directly mounted on the planting wheel shaft 82 or physically connected via a timing belt 78 or timing chain. A geolocation sensor (similar to location sensor 48 shown in FIG. 3) may be used to continuously monitor the geospatial location of the system. The geolocation sensor may comprise GPS, an odometer, or the like.

FIG. 9 shows a side view of a signaling compound applicator assembly 90 configured to be coupled to or operate subsequent to the crop transplanter 70 (FIG. 8). A pair of spray actuators 98 are held below rack 95 via clamps 97 and extensions 94. Actuators 98 house signaling compound spray canisters at an orientation such that signaling compound is directed at crop plant 32, and stem 32a, subsequent to being implanted.

Using knowledge of the vehicle travel speed, the physical geometry of the transplanter, the relative location of the signaling compound canister nozzle and the real-time plant 32 location, a computer or controller (not shown) synchronizes the actuation of the actuators 98 (multiple sprayers preferably aimed at the same plant can be used for better coverage) with the plant 32 motion so that the signaling compound is automatically applied to the plant when the plant is located in front of the actuators 98.

It is appreciated that the embodiment shown in FIG. 8 and FIG. 9 is one approach to signaling compound application, and that alternative methods or systems of sensing the presence of the crop plant (such as machine vision, LIDAR, a light curtain sensor, etc.) are contemplated.

This on-the-fly technique has several advantages: 1) plant pre-singulation is already incorporated into the process (eliminates the need for a separate pre-singulation step in the greenhouse), 2) it increases the efficiency of the application of the signaling compound, both in terms of coverage as well as targeting the part of the plant that will be visible after planting and ensuring that the newest growth is treated, and 3) it eliminates the need for handling the plants after the crop signaling compound has been applied.

While the implementation shown in FIG. 9 uses a pressurized spray canister containing the signaling compound to deliver the material to the crop, large acreage applications may employ a traditional industrial spray system such as a pneumatic powered electrostatic sprayer or a pump-based spray system (not shown), where larger quantities of the signaling compound contained in a spray tank could be used.

On-farm crop signaling can also be achieved using physical plant labels that are co-located with the crop plants. For example, a physical label can be created using a biodegradable corn-based drinking straw 120 (i.e. a biodegradable tube) as a physical structure (see FIG. 13A, FIG. 13B).

For example, crop signaling compound may be coated on the exterior of the tube (or the tubes are pre-coated or otherwise composed of the signaling compound). In one application (not shown), a temporary support structure may be created using wood base containing vertical rods (e.g. nails) located at the center-to-center spacing of a transplant tray, with one rod per cell in the tray. The tubes are placed over each rod, one tube per cell. The transplant tray is filled with potting soil and the crop seeds are planted in the tray using standard industry methods. Once the crop has germinated and reached the desired transplant stage, the plants with attached labels are transplanted into the field using industry standard equipment.

Other examples of physical crop signaling plant labels include: a paper or fabric tab attached to plant tape, a wooden stirring stick, a crop signaling mark applied directly to the soil adjacent to the crop. Ideally, the label materials are low cost and biodegradable. They can be attached to the plant, the soil, the seed, and applied prior to planting or at the time of planting.

FIG. 10 shows a side view of a plant care assembly 100 incorporating both a crop identification system 30 and a plant care device 50. The assembly generally comprises a support structure 102 housing a detector 112 (one embodiment of the signal sensor 36 shown in FIG. 3) along with the plant care device 50 and other optics for illumination, filtering, and light manipulation.

Ideally, the crop signal detection capability is matched to the crop signaling technology. For example, if a fluorescent molecule is selected as the crop signaling compound, then the crop signal detection capability is optimized for detection of a fluorescent emission signal.

For outdoor fluorescent signal detection, the assembly support structure 102 may be configured as a controlled illumination structure that is wrapped with an optical barrier film (not shown) selected to control the amount and spectral composition of sunlight that enters the crop detection zone (typically located in the center of the structure). A common optical barrier film material is sheet metal, which acts as a neutral density filter. An optical band pass filter or notch filter barrier film, such as a transparent colored polyvinyl chloride plastic film can be used for a dual featured crop signaling compound, such as a material that has both a fluorescent emission and pigment reflectance at a common optical frequency. Slitted rubber curtains (not shown) may also be located at the entrance 114 and exit 116 to block light at these locations.

The detector 112 is located inside the support structure 102, positioned and oriented to sense objects in the crop detection zone. For an optical signal, the detector 112 is typically a digital or analog camera, however other forms of optical sensors, such as optical scanners, or phototransistors, can be used. The detector 112 configuration may also be optimized to match the crop signal compound to be detected. For example, if the crop signaling compound is a green fluorescent compound (such as eGFP, or a green fluorescent acrylic paint) then an optical detector sensitive to the green portion of the spectrum would be selected. In practice, this could be a color camera, which contains a green image channel, or a monochromatic camera that has an internal or external green band pass filter in the optical path.

The crop identification system 30 is preferably configured to allow robust detection of the part of the crop plant containing the crop signaling compound. If the compound is located on the crop foliage and is best viewed from above the plant, then detector 112 (e.g. camera) may be positioned at an elevation and oriented downward as shown in FIG. 10, with a single top view of the scene.

In some crops, superior biological performance may be obtained by locating the crop signaling compound in a portion of the plant 32 other than the foliage (see FIG. 8). In tomato, for example, superior biological performance is obtained by locating the crop signaling compound on the surface of the crop stem 32a, rather than the foliage. In this case, additional optical elements 48 (FIG. 3) may be incorporated to optimize the detection of the crop stem containing the signaling compound. In the example implementation, this feature consists of a set of 6 light reflecting mirrors (a center mirror 104a and two side mirrors 104b on each side of the crop detection zone (see FIG. 10)), which allow simultaneous, real-time multi-view imaging of the crop detection zone. For each single image acquired by the camera, the crop detection zone is simultaneously viewed from seven vantage points (a top view and six side views from each mirror 104a/104b). This feature greatly improves the reliability of the assembly 100 in natural outdoor environments, where objects, such as weeds, dirt clods, or prior crop residue, etc. may obscure the view from one or more vantage points.

For passive crop signaling compounds, a signal activation source will generally be implemented. For example, if the crop signaling compound is a green fluorescent compound (such as eGFP, or a green fluorescent acrylic paint) then an excitation source is required. In the case of eGFP, the source would be a monochromatic light with a peak emission near 490 nm and a narrow optical bandwidth of the emitted light (consistent with the Stokes shift for eGFP). In the tomato plant example, the location of the monochromatic lights 106 would be positioned to optimize the excitation of the crop signaling compound on the tomato plant stem, and thus mounted below the mirrors as shown in FIG. 10. For a foliage-based crop signaling compound, the light/lights (not shown) would be mounted in the upper portion of the support structure 102 and directed downward to illuminate the foliage. A common means of creating a monochromatic light source is by the use of light emitting diodes (e.g. LEDs), with optical sharpening filters (not shown) used as appropriate for narrowing the optical bandwidth of the LED and the Stokes shift of the fluorescent compound.

The plant care assembly 100 is also equipped with plant care capability via one or more plant care devices 50. In an agricultural context, plant care is implemented either mechanically using cultivation tools or by the application of crop nutrition or protection compounds to the crop. Crop thinning or weeding are two common plant care tasks that can be provided by the plant care assembly 100.

In one embodiment, a set of miniature mechanical robotic hoes (110) are located directly behind the crop detection zone. In the example implementation, the robotic hoes 110 are articulated and move under pneumatic power (electric or hydraulic powered hoes are also suitable). An electro-pneumatic valve 120 is actuated in real-time by an on-board controller (e.g. computer or computing device 40 in FIG. 3) that can energize a pneumatic cylinder 108 to change the position of the hoe blades 110 (FIG. 10) relative to the crop plant in real-time as needed to perform the desired soil tillage or weeding task in close proximity to the crop. When the cylinders 108 are extended, the hoe blades 110 move towards each other, so that the interior tips of the two hoes touch. In this position all plants are killed as they pass by the hoes. When the cylinders 108 are retracted, the hoe blades 110 move apart, leaving a gap between them and allowing plants 32 to pass by without harm. The geolocation of the plant 32 is determined, using geolocation sensor 48 (FIG. 3) (e.g. an onboard RTK-GPS or odometry sensor), at the time each plant 32 is inspected for the presence of the crop signal. Plants exhibiting the crop signal are classified as crop plants, and those without the signal are classified as weeds. The plant care assembly 100 guides the robotic hoes 110 to circumvent the crop plants 32, leaving them unharmed, while positioning the hoes 110 to kill weeds as they pass.

The plant care assembly 100 may also be configured to care for plants by applying a precision micro-dose of liquid onto individual leaves of both crop plants and weeds using a series of micro-dosing spray jets 118. Spray jets 118 may be configured as electronically controlled, individual leaf sprayers located at the exit 116 of the plant care assembly 100. Plants 32 identified as crop plants by the plant care assembly 100 can be sprayed with fungicides, insecticides, or nutrients, while plants identified as weeds can be sprayed with herbicides by the system. In a preferred embodiment, each sprayer 118 comprises a bank of individual solenoid valves connected to micro-jet nozzles (not shown). When a solenoid valve of the sprayer 118 is energized by the controller 40 (FIG. 3), liquid flows through the nozzle. The nozzles are generally aligned in a row that is perpendicular to and spanning the row of plants 32.

While the automatic hoes 110 and micro-dosing spray jets 118 are shown for the plant care devices 50 in the embodiment illustrated in FIG. 10, it is appreciated that any number of devices may be used in combination with the crop identification system 30.

The hardware (including plant care devices 50 and components of the crop identification system 30) as well as software (e.g. application programming 46) used to operate the plant care assembly 100 may vary depending upon the type of plant care desired. For example, if the goal is to kill weeds using the robotic hoes or to spray the crop with fungicide, insecticide or nutrients, then weed mapping is generally not needed (e.g. segmentation/identification data 54 is used as opposed to weed/crop map 52, see FIG. 3). If the goal is to spray weeds with herbicides, then detection and mapping of both the crop and the weeds (e.g. crop/weed map 52) would be used.

For mechanical weed control, sole use of a crop signal detection system 30 is sufficient. In a first exemplary configuration where the crop signaling compound is fluorescent protein eGFP, the illumination hardware 106 comprises one or more monochromatic light sources such as a set of blue LEDs (such as the LUXEON Rebel LXML-PB01-0040) emitting light at 470 nm (peak emission). An optical sharpening filter (such as the Andover Corp. 470FS10) may be placed in front of each LED to confine the light emission to a narrow waveband within the Stokes shift of the eGFP molecule. A monochromatic camera (FIG. 10, either a line scan camera or a 2D array camera can be used, but one exemplary embodiment comprises the Basler model scA1600-28 gm with a monochrome 2d image sensor) may be used as the detector 112. A high quality lens (such as the Computar M0824-MPW, not shown) may be mounted on the camera 112. An optical band pass filter (such as the Semrock FF01-520/35, not shown) may be mounted on the front of the lens and used to block all light except light in the 500 nm to 550 nm region of the spectrum. This optical configuration prevents the camera 112 from detecting blue light and only allows it to observe fluorescent objects that are excited by 470 nm blue light and emit green light between 500 nm and 550 nm in response. The fluorescent protein eGFP is such a material.

A sufficiently powerful computer (e.g. computer 40) with data connection (e.g., Ethernet, USB, Camera Link, or FireWire or other interface compatible with the corresponding model of camera) may be used to interface the computer 40 with the camera 112. A location sensor 48 (e.g. odometry sensor comprising a high speed counter, such as the National Instruments USB-6009, an optical shaft encoder, such as the Grayhill Inc. 63KS256, and an unpowered ground wheel with the shaft encoder mounted on the wheel's axel, all not shown) may be used to track geolocation along the crop row in real-time.

With respect to application programming 46, the manufacturer's software development kit for the camera 112 and additional programming is used to create a software application that allows the computer 40 to control the camera 112 (including setup and image acquisition).

In real-time, the computer 40 sends an image acquisition command to the camera 112 in order to acquire a new image. In response, the camera 112 acquires an image and transmits it to the computer 40.

Simultaneously the computer determines the geolocation using the location sensor 48 (e.g. in the case of the odometry sensor, by reading the counter on the USB-6009) to determine the geolocation of the system 100 at the time the image was acquired.

The application programming 46 then receives the image. The image in this example would be a monochromatic image with a grayscale pixel bit depth of 12 bits, where 0 is black and $2^{12}=4095$ is white. Objects containing no eGFP will appear dark with intensities near 0, while objects containing eGFP will appear bright with intensities near 4095.

During system setup and calibration in the field, the optimum threshold value between 0 and 4095 (for the grayscale image) for automatic discrimination of objects containing eGFP and those without eGFP will be determined. This value will be used to apply the grayscale image segmentation technique (step 26 in FIG. 2) to threshold the image into crop (bright objects containing eGFP and above the threshold) and background (dark objects without eGFP and below the threshold).

Using this information, the computer segments the image into crop and background objects (i.e. it creates a binary segmented image 54, FIG. 3). FIG. 11A through 11C illustrate generation of a binary image from an image of a crop (e.g. tomato) treated with a crop signaling compound before transplanting (FIG. 11A shows an image of just the tomato plant, with FIG. 11B showing a processed image with tomato as red and weed foliage as blue). FIG. 11C shows the final binary image, in which tomato and soil (background) are white, and weed foliage is black. For the image of FIG. 11C, weed detection is shown by subtracting the identified tomato foliage from all foliage in the image. However, for crop identification, weed foliage would be subtracted from all foliage in the image.

If the crop signal (i.e. the eGFP) is present in the crop 32 foliage, only the top view image is used. Here, standard machine vision techniques are used for binary blob recognition of the foliage containing the crop signal and the centroid of all crop objects in the image is determined using a machine vision software library appropriate to the software language used (e.g. Open CV for the C/C++ language or Vision Development Module for the LabVIEW language). This centroid position is defined as the centroid of the crop plant 32 and recorded in computer memory.

If the crop signal is present in the crop stems or a plant label parallel to the stem, multi-view imaging is used to improve the reliability of crop detection. In this example, side views of the crop are captured with the assistance of mirrors mounted on the side of the plants. As an alternative, the side view images could be acquired using additional cameras mounted in the same location and replacing the mirrors. In this example, six mirrors (104a, 104b) are used to have side views in addition to the top view image (see FIG. 10, FIG. 14A and FIG. 14B), where the mirrors are arranged in two groups of three mirrors, mounted on each side of crop row. Mirrors 104a are parallel to the travelling direction, and mirrors 104b are approximately at 30 degrees relative to the travelling direction. The six mirrors are also tilted relative to the ground plane at an angle that provides side views of the whole crop plant (see images of FIG. 14A and FIG. 14B for reference) to be shown in the camera image. The application programming 46 divides the image into a top view image and side view images in which six regions of interests (ROIs) in the side views are used for binary blob recognition and localization of the crop signaling material. The localization of the crop signal is the mapping from the ROIs (i.e. side views presented in the main image) to the top view coordinates in order to determine the actual location of the crop signal in the top view coordinate system and to be compatible with the method described above.

If the crop signal is present in all six ROIs (i.e. as binary blobs), named as top-left, middle-left, and bottom-left blobs for the blobs present in the left-side mirrors along the row, and top-right, middle-right, and bottom-right blobs for the blobs present in the right-side mirrors, a cross validation is used to find the actual eGFP location. For the top-left blob, its bottom-right coordinate is extracted for the cross validation. In the same manner, for the middle-left, bottom-left, top-right, middle-right, and bottom-right blobs, their right-most, top-right, bottom-left, left-most, and top-left coordinates are extracted, respectively. A set of three lines is then created connecting top-left and bottom-right diametrically opposed blobs (through their bottom-right and top-left coordinates), bottom-left and top-right diametrically opposed blobs (through their top-right and bottom-left coordinates), and middle-left and middle-right diametrically opposed blobs (through their right-most and left-most coordinates). The average location of intersections of the three lines is calculated, defined as the centroid of the crop plant, and recorded in computer memory.

If the crop signal is present in less than six ROIs, the connections between top-left and bottom-right blobs, bottom-left and top-right blobs, and middle-left and middle-right diametrically opposed blobs are checked separately in turn. When a connection is found (among the three possible connections), the average position of two coordinates (of a connection) is calculated as the centroid of the crop plant, and recorded in computer memory.

If the crop signal is present in only one ROI or none of the three connections are satisfied (i.e. there may be more than one ROI available in this case but no connections between top-left and bottom-right, bottom-left and top-right, and middle-left and middle-right diametrically opposed blobs exist), the centroid of the crop plant 32 is determined based on a relative distance from a ROI to the center of the top view image.

At a continuous forward travel speed of 2 miles per hour, and using a 2D array camera with a frame rate of 28 images per second, the plant care assembly 100 has about five opportunities to detect the crop signaling compound as the crop plant 32 travels through the crop detection zone.

As the plant care assembly 100 travels along the row, a continuous panoramic view of the row is created by acquiring a sequence of images, processing them as described above in real-time to detect the crop plants and recording their geolocation using the centroid information within each image for the crop plus the odometry geolocation for the image itself. When the robotic weed hoes 110 (FIG. 10) are located between crop plants, the computer 40 extends the pneumatic cylinders 108 to cause the two hoes 110 to touch and kill all weeds in their path. When the robotic hoes 110 approach a crop plant location stored in computer memory 44, the computer 40 retracts the pneumatic cylinders 108 to cause the two hoes 110 to separate, leaving a gap between them and allowing the crop plant 32 to pass by unharmed.

In a second exemplary configuration, the crop signaling compound comprises a fluorescent acrylic paint topically applied to the crop 32 at planting or optionally applied to a physical plant label that is co-located with the crop plant 32 at planting (e.g. straw 120 shown in FIGS. 13A and 13B). In this configuration, exemplary illumination hardware 104 comprises a monochromatic light source such as a set of UV LEDs (such as the LED Engin LZ4-00UA00-00U4), emitting light at 385 nm (peak emission). Due to the long Stokes shift of this crop signaling compound, no optical sharpening filter is used.

Due to the long Stokes shift, maximum flexibility in working with multiple fluorochromes can be achieved by using a color camera (e.g. a line scan camera or a 2D array camera can be used, such as a Basler model scA1600-28 gc with a 2D array color image sensor) for the detector 112. A high quality lens (such as the Computar M0824-MPW) may also be mounted on the camera.

With respect to application programming 46, the manufacturer's software development kit for the camera 112 and additional programming is used to create a software application that allows the computer 40 to control the camera 112 (including setup and image acquisition).

In real-time, the computer 40 sends an image acquisition command to the camera 112 in order to acquire a new image. In response, the camera 112 acquires an image and transmits it via Ethernet to the computer 40. Simultaneously the computer determines the geolocation using the location sensor 48 (e.g. in the case of the odometry sensor, by reading the counter on the USB-6009) to determine the geolocation of the system 100 at the time the image was acquired.

The software application programming 46 then receives the image. The image in this example would be a color image with a color pixel bit depth of 8 bits per channel (i.e. a 24-bit color image). Objects not containing the crop signaling compound will appear dark with intensities in all three channels near 0, while objects containing the crop signaling compound will appear as bright, highly saturated colored objects. The hue of the objects containing the crop signaling compound will be the hue of the fluorescent emission when excited by UV light.

During system setup and calibration in the field, the optimum color threshold values for automatic discrimination of the objects bright, highly saturated colored objects containing the crop signaling compound from those without the signaling compound (which will be dark and unsaturated) will be determined. This process is called color segmentation, and is typically conducted in the hue, saturation and brightness (HSB) color space, where thresholds for hue, saturation and brightness are analogous to the grayscale thresholds described above for eGFP. Alternatives to using HSB color space, such as Excessive Hue (e.g. excessive green for a green fluorescing protein) thresholding, may also be implemented for the color segmentation task.

Using this color segmentation information, the application programming 46 segments the image into crop and background objects (i.e. it creates a binary image). Once a binary image is obtained (e.g. FIG. 11C), the crop detection and weed knife control tasks are followed as detailed above.

In a third exemplary embodiment, precision micro-dosing of plant care compounds is performed with plant care assembly 100. In this case, application programming 46 is configured for both crop signal detection and general crop mapping.

In a first scenario, it is assumed that the crop signaling compound is the systemic fluorescent compound Rhodamine B applied to the crop prior to planting. As a systemic crop signaling compound, the signal will be translocated through the vascular system of the crop plants (see FIG. 7).

In this exemplary configuration, illumination hardware 106 comprises a dual source system, where one source is designed to activate the crop signaling compound, and the second source is designed to facilitate mapping of weeds. For the Rhodamine B example, the crop signaling illumination source 106 is provided as a set of green LEDs (such as the LED Engin LZ4-00G108-0000), emitting light at 523 nm (peak emission). An optical sharpening filter (such as the Thorlabs Inc. FESH0550) is placed in front of each LED to confine the light emission to a narrow waveband within the Stokes shift of the Rhodamine B molecule.

Two options can be used for the second illumination source 106 designed to facilitate mapping of weeds. Weed illumination option A comprises a set of blue LEDs (such as the LED Engin LZ4-00B208-0000), emitting light at 460 nm (peak emission). Due to the long Stokes shift of this crop signaling compound, no optical sharpening filter is required for these blue LEDs. Weed illumination option B comprises a set of white LEDs (such as the LED Engin LZ4-00NW08-0040). No optical sharpening filter is required for these white LEDs. For this option, an electrical relay (not shown, such as the Crydom Inc. DR24A06) is used to allow the computer 40 to energize and de-energize the white LEDs. The relay may be interfaced to the computer 40 via a digital output on the National Instruments USB-6009 controller.

For detector 112, two cameras are used, one configured to detect the crop signaling compound, and a second camera configured to map weeds.

For detection of the crop signaling compound, a monochromatic camera (e.g. a line scan camera or a 2D array camera) is used. A high quality lens (such as the Computar M0824-MPW) is mounted on the camera, with an optical band pass filter (such as the Semrock FF03-575/25) mounted on the front of the lens to block all light except light in the 552 nm to 596 nm region of the spectrum. This optical design, prevents the camera from detecting light from the green and blue LEDs and only allows it to observe fluorescent objects that are excited by 523 nm green light and emit orange light between 552 nm and 592 nm in response. The fluorescent compound Rhodamine B is such a material.

For detection of the weeds, a color camera (e.g. a line scan camera or a 2D array camera, such as a Basler model scA1600-28 gc with a 2D array color image sensor) is used. A high quality lens (such as the Computar M0824-MPW) is mounted on the camera.

A sufficiently powerful computer (e.g. computer 40) with data connection (e.g., Ethernet, USB, Camera Link, or FireWire or other interface compatible with the corresponding model of camera) may be used to interface the computer 40 with the cameras 112. A location sensor 48 (e.g. odometry sensor comprising a high speed counter, such as the National Instruments USB-6009, an optical shaft encoder, such as the Grayhill Inc. 63KS256, and an unpowered ground wheel with the shaft encoder mounted on the wheel's axel, all not shown) may be used to track geolocation along the crop row in real-time.

With respect to application programming 46, the manufacturer's software development kit for the camera 112 and additional programming is used to create a software application that allows the computer 40 to control the camera 112 (including setup and image acquisition).

The application programming 46 then manages, in real-time, the image acquisition of both the crop signaling camera, and the weed mapping camera. If weed illumination option A is used, then both cameras can be operated asynchronously and with overlapped acquisition cycles. If weed illumination option B is used, then the application programming 46 coordinates the actuation of the white LEDs when the weed mapping camera is used, and the deactivation of the white LEDs when the crop signaling camera is used. Further, for weed illumination option B, the image acquisition events of the two cameras cannot overlap. For both cameras, in response to the respective control commands from the computer, each camera acquires an image and transmits it to the computer 40. The application programming 46 also determines the geolocation at which each image is acquired using the location sensor 48 (e.g. odometry sensor by reading the counter on the USB-6009) to determine the geolocation of the plant care assembly 100 at the time the image was acquired.

The application programming 46 then receives images from each camera. The generation of the image from the crop signaling camera and creating the binary image of the crop plant are performed as detailed above in the first exemplary embodiment. The image from the weed mapping camera illustrates the process of creating the binary image of all the plants in the image is as described above for the second exemplary embodiment, except that the hue selected would be the natural green color of the weeds. Weed blob detection would be achieved by subtracting the crop binary image from the all plant binary image, as shown in FIG. 11C.

Once the binary crop and weed images are created, a plant care treatment map is created, as illustrated in FIG. 12A and FIG. 12B. An application grid, with a resolution of approximately 1 cm by 1 cm is overlaid on the binary image (alternative grid resolutions are possible as appropriate for the actuation times of the micro-jet spray applicator 118 and travel speed of the plant care assembly 100) to result in the image of FIG. 12B. Grid cells containing crop plant foliage blobs are mapped as crop cells. Similarly, grid cells containing weed plant blobs are mapped as weed cells. Cells containing both crop and weed blobs are mapped as crop cells.

The 1 cm by 1 cm resolution crop and weed plant map may then be used to create a treatment map to control the micro-dosing sprayers 18. For example, weed cells are designated as regions to be treated with herbicide. Adjacent weed cells in the direction of travel are merged to improve response time and the valve on the herbicide spray manifold corresponding to the nozzle that is above that region shown in the map is energized by the computer when the nozzle is located above the weeds in the treatment map. Similarly, fungicides, insecticides, or plant growth nutrients are applied by the respective spray valve/nozzles on separate manifolds corresponding to these beneficial materials and the location of the cell in the map under computer control for cells mapped as being crop cells.

a. Results

Various outdoor tests were conducted to compare crop signaling characteristics in daylight conditions.

FIG. 13A shows a digital color photograph of a lettuce plant and a crop signaling transplant stake 120 in the form of a drinking straw tube having a fluorescent dye. In this example, the appearance of the lettuce foliage and the transplant stake 120 are similar (i.e. both are light green in color). When the scene in FIG. 13A is illuminated using UV blacklight, without visible light, the fluorochrome of the crop signaling material in the transplant stake 120 fluoresces brightly making it appear bluish white (or simply white in FIG. 13B) while the lettuce plant appears dark. Using the crop signaling method, a robot with a machine vision sensor could uniquely and easily identify and locate the crop plant without error.

FIG. 14A shows a white light illuminated image of field-grown tomato plants with the crop signaling plant label viewed via a crop identification system 30 in accordance with the present description. Mirrors 104a provide a side 90 degree side view of the crop plant, while mirrors 104b provide oblique views of the plant. Thus, the plant is viewed from 7 different views in one image.

FIG. 14B shows same scene as shown in FIG. 14A, but with UV light illuminating the scene, illustrating the fluorescent feature of the crop signaling compound (e.g. transplant stake 120) and the ease of detection.

FIG. 15A is a close up photograph showing the tomato foliage coated with a fluorescent orange material. FIG. 15B is an image after automatically generated computer vision techniques were applied to the image of FIG. 15A. The coated tomato foliage was colored purple (illustrated by the more dramatic contrast to the background) by the imaging techniques of the present technology.

FIG. 16A through FIG. 16D show outdoor crop signaling feasibility. FIG. 16A is a daytime photograph taken from inside a cultivation tunnel showing a transplanted tomato and a purslane weed. Sunlight enters the tunnel from the bottom (South facing) and top (North facing) of the photo. Tomato foliage was coated with a fluorescent orange material before planting. FIG. 16B is an image taken during the day, immediately after the image of FIG. 16A, but with 400 Watts of UV light adding to the sunlight inside the tunnel. FIG. 16C is an automatically generated image using computer vision techniques by subtracting FIG. 16A from FIG. 16B, with the light shades corresponding to the isolated crop plant. FIG. 16D is a 3D version of FIG. 16C illustrating the signal to noise ratio.

b. Non-Optical Crop Signaling

While the systems an methods above are primarily directed to optical crop signaling systems and methods, and corresponding systems for detection/sensing thereof, it is appreciated that other crop signaling modalities may be employed. For example, all of the crop signaling methods detailed above for step 12 of FIG. 1 (e.g. transgenic methods, systemic translocation, foliar coating, and plant labels) may be used to apply a magnetic or radio frequency (RF) based crop signal. For example, a magnetic compound may be added to the crop signal compound and applied using any of the devices or methods employed above for an optical crop signal. Similarly, an RF tag may be applied to a plant label for RF signal detection. Signal sensor 36 in FIG. 3 may accordingly be configured to sense the applied non-optical crop signal (e.g. via a magnetic field sensor, RF scanner, or the like).

In one embodiment, a magnetic acrylic paint was administered on a tomato plant stem and tests were performed with a Honeywell HMC1021Z magneto resistive magnetic field sensor to determine identify and location the target plant within a target region of interest. FIG. 17 shows a plot of the change in the magnetic field caused by magnetic crop signal created when the tomato plant passes by the magnetic field sensor, and clearly indicates the feasibility of machine identification of the crop plant via a magnetic crop signaling.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that that the present disclosure encompasses multiple embodiments which include, but are not limited to, the following:

1. A plant care method, comprising: applying a crop signaling material to a target plant of interest; wherein crop signaling material is configured to produce a unique machine-recognizable crop signal indicative of the target plant; performing machine sensing to detect and locate the unique crop signal carried by the target plant from among other vegetation and background in proximity to the target plant; and performing plant care associated with the target plant in response to said detection and location of the unique crop signal.

2. The method of any preceding embodiment, wherein the crop signal comprises an optical crop signal, and wherein performing machine sensing to detect and locate the unique crop signal comprises: acquiring one or more digital color images of the target plant; and segmenting the one or more digital color images into image segments representing crop, weed, and background objects as a function of the optical crop signal.

3. The method of any preceding embodiment, further comprising: generating a 2-D high resolution plant map comprising finite locations of target plant and finite locations of weed plant within an area of interest with respect to the target plant.

4. The method of any preceding embodiment, wherein performing plant care comprises activating a weed removal apparatus based on identification of an image segment representing a weed, and selectively performing weed removal in a region corresponding to an image segment identified as containing the weed.

5. The method of any preceding embodiment, wherein activating a weed removal apparatus comprises selectively activating a mechanical hoeing device in the region.

6. The method of any preceding embodiment, wherein activating a weed removal apparatus comprises selectively spraying herbicide in the region.

7. The method of any preceding embodiment, wherein performing plant care comprises administering one or more of plant care nutrients, fungicides or pesticides based to a region corresponding to an image segment identified as the target plant.

8. The method of any preceding embodiment, wherein performing plant care comprises micro-dosing one or more of plant care nutrients, fungicides or pesticides at the finite locations of target plant and herbicide at finite locations of weed plant within an area of interest.

9. The method of any preceding embodiment, wherein applying a crop signaling material comprises genetically manipulating the plant to cause it to produce the unique crop signal.

10. The method of any preceding embodiment, wherein applying a crop signaling material comprises systemic uptake of the crop signal material into the target plant.

11. The method of any preceding embodiment, wherein the crop signaling material is applied as a coating to a seed configured to grow into the target plant.

12. The method of any preceding embodiment, wherein applying a crop signaling material comprises administering a foliar application of the signaling material to the target plant.

13. The method of any preceding embodiment, wherein applying a crop signaling material comprises applying the crop signaling material to a plant label configured to remain in proximity to the target plant.

14. The method of any preceding embodiment, wherein the crop signal comprises a magnetic crop signal, and wherein performing machine sensing to detect and locate the unique crop signal comprises: acquiring magnetic field data within a region of interest comprising the target plant; and determining the identity and location of the target plant within the region of interest.

15. A plant care apparatus, comprising: (a) a signal sensor; (b) a processing unit; and (c) a non-transitory memory storing instructions executable by the processing unit; (d) wherein said instructions, when executed by the processing unit, perform steps comprising: (i) sensing with the signal sensor a region of interest comprising a vegetation and a target plant having a crop signal, the crop signal comprising a unique-machine-readable signal indicative of the target plant; and (ii) detecting and locating the unique crop signal carried by the target plant from among the vegetation and background in proximity to the target plant.

16. The apparatus of any preceding embodiment: wherein the crop signal comprises an optical crop signal; wherein the signal sensor comprises a camera; and wherein detecting and locating the unique crop signal comprises: acquiring one or more digital color images of the target plant; and segmenting the one or more digital color images into image segments representing crop, weed, and background objects as a function of the optical crop signal.

17. The apparatus of any preceding embodiment, wherein said instructions, when executed by the processing unit, further perform steps comprising: generating a 2-D high resolution plant map comprising finite locations of target plant and finite locations of weed plant within an area of interest with respect to the target plant.

18. The apparatus of any preceding embodiment, further comprising: a weed removal apparatus coupled to the processing unit; the weed removal apparatus configured for selectively performing weed removal in a region corresponding to an image segment identified as containing the weed.

19. The apparatus of any preceding embodiment, wherein the a weed removal apparatus comprising an automatic mechanical hoe configured to disrupt soil in the region corresponding to an image segment identified as containing the weed.

20. The apparatus of any preceding embodiment, further comprising: a micro-dosing apparatus coupled to the processing unit; the micro-dosing apparatus comprising a plurality of independently operable spray nozzles configured to dispense finite micro-doses of or more of plant care nutrients, fungicides or pesticides at the finite locations of target plant and micro-doses herbicide at finite locations of weed plant within an area of interest.

21. The apparatus of any preceding embodiment: wherein the crop signal comprises a magnetic crop signal; wherein the signal sensor comprises magnetic field sensor; and wherein detecting and locating the unique crop signal comprises: acquiring magnetic field data within a region of interest comprising the target plant; and determining the identity and location of the target plant within the region of interest.

22. A plant care apparatus, comprising: (a) a optical sensor; (b) a processing unit; and (c) a non-transitory memory storing instructions executable by the processing unit; (d) wherein said instructions, when executed by the processing unit, perform steps comprising: (i) acquiring digital color images of a target vegetation object using the optical sensor; (ii) segmenting the images into image segments representing crop, weed, and background objects using crop signal information; and (iii) activating a weed removal apparatus based on identification of an image segment representing a weed.

23. The apparatus of any preceding embodiment, further comprising an applicator device that dispenses a crop signaling material to a target of interest.

24. The apparatus of any preceding embodiment, wherein said instructions, when executed by the processing unit, perform steps comprising processing the digital color images to identify vegetation to which the crop signaling material has been applied.

25. A plant care method, comprising: (a) applying a crop signaling material to vegetation of interest; (b) acquiring digital color images of vegetation that includes the plant; (c) segmenting the images into image segments representing crop, weed, and background objects using crop signal information; and (d) activating a weed removal apparatus based on identification of an image segment representing a weed; (e) wherein said method is performed using an optical sensor to acquire said images and a processing unit with a non-transitory memory storing instructions which when executed by the processing unit perform steps (b) through (d).

26. The apparatus of any preceding embodiment, wherein the applicator device comprises a location sensor coupled to an automatic replanting assembly, and a signal dispensing device for applying a crop signal while the crop plant is being planted.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A plant care method, comprising:
   applying a crop signaling material to a target plant of interest, wherein:
   the crop signaling material is configured to produce a unique machine-recognizable crop signal indicative of the target plant; and
   the unique crop signal comprises a magnetic crop signal;
   performing machine sensing to detect and locate the unique crop signal carried by the target plant from among other vegetation and background in proximity to the target plant by:
   acquiring magnetic field data within a region of interest comprising the target plant; and
   determining the identity and location of the target plant within the region of interest; and
   performing plant care associated with the target plant in response to said detection and location of the unique crop signal.

2. The method of claim 1, wherein the crop signal further comprises an optical crop signal, and wherein performing machine sensing to detect and locate the unique crop signal further comprises:
   acquiring one or more digital color images of the target plant; and
   segmenting the one or more digital color images into image segments representing crop, weed, and background objects as a function of the optical crop signal.

3. The method of claim 2, further comprising:
   generating a 2-D high resolution plant map comprising finite locations of target plant and finite locations of weed plant within an area of interest with respect to the target plant.

4. The method of claim 3, wherein performing plant care comprises micro-dosing one or more of plant care nutrients, fungicides or pesticides at the finite locations of target plant and herbicide at finite locations of weed plant within an area of interest.

5. The method of claim 2, wherein performing plant care comprises activating a weed removal apparatus based on identification of an image segment representing a weed, and selectively performing weed removal in a region corresponding to an image segment identified as containing the weed.

6. The method of claim 5, wherein activating a weed removal apparatus comprises selectively activating a mechanical hoeing device in the region.

7. The method of claim 5, wherein activating a weed removal apparatus comprises selectively spraying herbicide in the region.

8. The method of claim 2, wherein performing plant care comprises administering one or more of plant care nutrients, fungicides or pesticides based in a region corresponding to an image segment identified as the target plant.

9. The method of claim 1, wherein applying a crop signaling material further comprises systemic uptake of the crop signaling material into the target plant.

10. The method of claim 9, wherein the crop signaling material is applied as a coating to a seed configured to grow into the target plant.

11. The method of claim 1, wherein applying a crop signaling material further comprises administering a foliar application of the signaling material to the target plant.

12. The method of claim 1, wherein applying a crop signaling material further comprises applying the crop signaling material to a plant label configured to remain in proximity to the target plant.

13. The method of claim 1, wherein the crop signaling material comprises magnetic paint.

14. A plant care apparatus, comprising:
(a) one or more signal sensors, including a magnetic field sensor;
(b) a processing unit; and
(c) a non-transitory memory storing instructions executable by the processing unit;
(d) wherein said instructions, when executed by the processing unit, perform steps comprising:
  (i) sensing with the one or more signal sensors a region of interest comprising a vegetation and a target plant having a crop signal, the crop signal comprising a magnetic crop signal uniquely indicative of the target plant; and
  (ii) detecting and locating the crop signal carried by the target plant from among the vegetation and background in proximity to the target plant by:
    acquiring magnetic field data within a region of interest comprising the target plant; and
    determining the identity and location of the target plant within the region of interest.

15. The apparatus of claim 14:
wherein the crop signal further comprises an optical crop signal;
wherein the one or more signal sensors further include a camera; and
wherein detecting and locating the unique crop signal further comprises:
  acquiring one or more digital color images of the target plant; and
  segmenting the one or more digital color images into image segments representing crop, weed, and background objects as a function of the optical crop signal.

16. The apparatus of claim 15, wherein said instructions, when executed by the processing unit, further perform one or more steps comprising:
generating a 2-D high resolution plant map comprising finite locations of target plant and finite locations of weed plant within an area of interest with respect to the target plant.

17. The apparatus of claim 15, further comprising:
a weed removal apparatus coupled to the processing unit;
wherein the weed removal apparatus is configured for selectively performing weed removal in a region corresponding to an image segment identified as containing the weed.

18. The apparatus of claim 17, further comprising a weed removal apparatus comprising an automatic mechanical hoe configured to disrupt soil in the region corresponding to an image segment identified as containing the weed.

19. The apparatus of claim 14, further comprising:
a micro-dosing apparatus coupled to the processing unit;
wherein the micro-dosing apparatus comprises a plurality of independently operable spray nozzles configured to dispense finite micro-doses of one or more of plant care nutrients, fungicides or pesticides at the finite locations of target plant and micro-doses of herbicide at finite locations of weed plant within an area of interest.

20. The apparatus of claim 14, wherein the magnetic crop signal is emitted by magnetic paint.

* * * * *